United States Patent [19]

Yamashita et al.

[11] Patent Number: 5,283,313
[45] Date of Patent: Feb. 1, 1994

[54] READILY PROCESSABLE POLYIMIDE, PREPARATION PROCESS OF POLYIMIDE, AND RESIN COMPOSITION OF POLYIMIDE

[75] Inventors: Wataru Yamashita; Shoji Tamai; Akihiro Yamaguchi, all of Kanagawa, Japan

[73] Assignee: Mitsui Toatsu Chemicals, Inc., Tokyo, Japan

[21] Appl. No.: 795,748

[22] Filed: Nov. 21, 1991

[30] Foreign Application Priority Data

Nov. 26, 1990 [JP] Japan ................... 2-320611
Dec. 28, 1990 [JP] Japan ................... 2-409104
Mar. 12, 1991 [JP] Japan ................... 3-046518

[51] Int. Cl.$^5$ .................. C08G 8/02; C08G 73/10; C08G 69/26
[52] U.S. Cl. ................... 528/125; 528/126; 528/128; 528/170; 528/172; 528/173; 528/179; 528/188; 528/207; 528/208; 528/222; 528/229; 528/351; 528/352; 528/353
[58] Field of Search .......... 528/125, 126, 128, 170, 528/172, 173, 179, 188, 207, 208, 222, 229, 351, 352, 353

[56] References Cited

U.S. PATENT DOCUMENTS 3,959,350  5/1976  Rogers .
3,998,786  12/1976  D'Alelio ..................... 528/125

FOREIGN PATENT DOCUMENTS 200204   11/1986  European Pat. Off. .
283835   9/1988   European Pat. Off. .
313407   4/1989   European Pat. Off. .
350203   1/1990   European Pat. Off. .
2222409  3/1990   United Kingdom .

OTHER PUBLICATIONS

J. Polymer Sci., Macromolecular Reviews, vol. 11, 161–208 (1976).
J. of Elastomers and Plastics, vol. 7, (Jul. 1975).
Polymer Engineering and Science, Nov., 1973, vol. 13, No. 6.
J. Polymer Sci., Polymer Chemistry Edition, vol. 14, 2275–2292 (1976).

*Primary Examiner*—John Kight, III
*Assistant Examiner*—P. Hampton-Hightower
*Attorney, Agent, or Firm*—Burns, Doane, Swecker & Mathis

[57] ABSTRACT

A readily processable polyimide being blocked at the terminal of a polymer molecule with a divalent radical derived from dicarboxylic acid anhydride represented by the formula (IV):

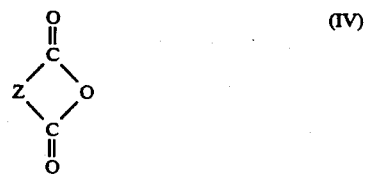

wherein Z is a divalent radical selected from the group consisting of a monoaromatic radical which is substantially unsubstituted or substituted with a radical having no reactivity with amine or carboxylic acid anhydride and has from 5 to 15 carbons atoms, condensed polyaromatic radical or noncondensed aromatic radical connected each other with a direct bond or a bridge member, and having a fundamental skeleton represented by recurring structural units of the formula (III):

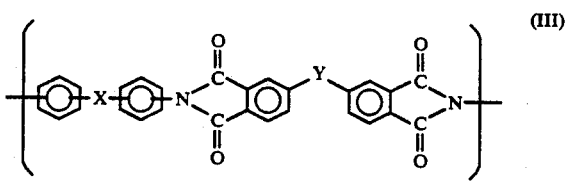

wherein X and Y are —O— or —CO— and differ each other; preparation process of the polyimide; and resin composition containing the polyimide and fibrous reinforcement.

12 Claims, 4 Drawing Sheets

READILY PROCESSABLE POLYIMIDE, PREPARATION PROCESS OF POLYIMIDE, AND RESIN COMPOSITION OF POLYIMIDE

Background of the Invention

1. Field of the Invention

The present invention relates to a melt-processable polyimide having excellent heat stability. More particularly, the invention relates to a polyimide which is excellent in heat resistance and heat stability, particularly in thermal-oxidative stability, dimensional stability and mechanical strength, and has outstanding processability; a process of preparing the polyimide; and a resin composition comprising the polyimide as a principal component.

2. Description of the Related Art

Polyimide obtained by reaction of tetracarboxylic acid dianhydride with diamine is excellent in mechanical strength and dimensional stability in addition to its substantially high heat resistance and also has flame retardance and electrical insulation property.

Because of these preferred properties, polyimide has been conventionally used in various fields such as electric and electronic appliances, space and aeronautical equipment, and transfer machinery, and is hereafter expected for wide use in fields requiring heat resistance.

Conventionally, various polyimide resins having excellent properties have been developed. Some of these polyimide resins, however, have no distinct glass transition temperature, though excellent in heat resistance, and must be processed by such means as sinter molding in the case of using these resins as molding materials.

Other kinds of polyimides are soluble in solvents such as halogenated hydrocarbons and are relatively poor in solvent resistance, though excellent in processability. Thus, polyimides having both merits and drawbacks in properties have been developed.

Many kinds of polyimide obtained by using diaminodiphenyl ethers as a diamine component have been known.

Polyimide prepared from 4,4'-diaminodiphenyl ether and pyromellitic dianhydride and composed of a fundamental skeleton of the formula (I):

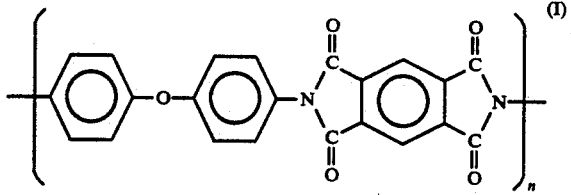

is reported, for example, in J. Polym. Sei. Macromol. Rev., 11, 16 (1976) and J. Elast. Plast., 7, 285 (1975). The polyimide have been developed by E. I. Du Pont de Nemours & Co. and is known as highly heat-resistant polyimide available under the names KAPTON and VESPEL (Trade marks of Du Pont).

The polyimide, however, is poor in thermal-oxidative stability though excellent in heat resistance, and causes severe reduction of mechanical strength in the case of using in the air at high temperature for a long period. The polyimide has no distinct glass transition temperature and is inferior in processability as a molding material, and hence has a disadvantage that the polyimide must be processed by such means as sinter molding.

Several investigations have also been carried out on the polyimide obtained by using diaminodiphenyl ethers as a diamine component and 3,3',4,4'-benzophenonetetracarboxylic dianhydride as a tetracarboxylic acid dianhydride component. For example, research on the fundamental heat properties of a polyimide film obtained by reaction of 4,4'-diaminodiphenyl ether with 3,3',4,4'-benzophenonetetracarboxylic dianhydride and composed of a fundamental skeleton of the formula (II):

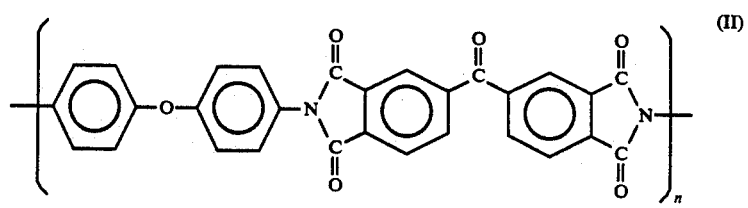

have been reported in J. K. Gillham et al.; Polym. Eng. Sci., Vol. 13, No. 6, 447~454 (1973) and V. Bell et al.; J. Polym. Sci., Polym. Chem. Edition, Vol. 14, 2275~2292 (1976). However, research on melt-flow properties or attempts to improve processing ability have never been carried out at all on these polyimide resins.

SUMMARY OF THE INVENTION

One object of the present invention is to further improve essentially excellent heat resistance of polyimide and to provide polyimide which resists structural failure even at high temperatures in the and has excellent processing ability and good chemical resistance in addition to outstanding heat stability.

Another object of the present invention is to provide a process for preparing the polyimide having the above properties.

A further object of the present invention is to provide a novel polyimide resin composition which is excellent in heat resistance, thermal-oxidative stability, dimensional stability and mechanical strength.

As a result of an intensive investigation in order to accomplish the above objects, the present inventors have found that polyimide exhibits an improved thermal-oxidative stability and excellent processing ability when the polyimide has a fundamental skeleton represented by the formula (III):

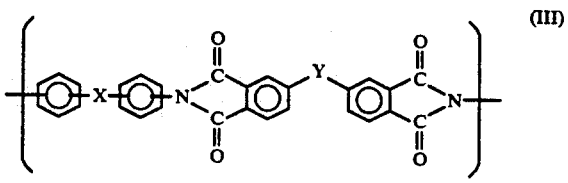

wherein X and Y are —I— or —CO— and differ from each other, that is, the polyimide has both ether bonds

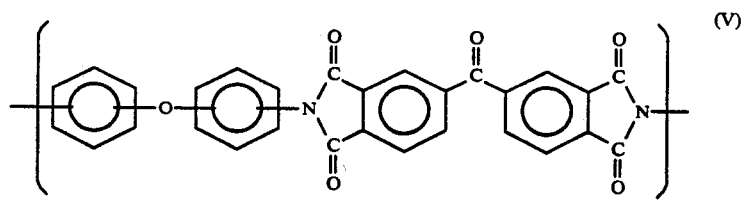

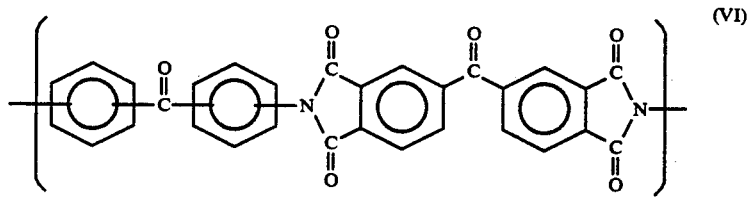

and carbonyl bonds and is blocked at the polymer terminal with a dicarboxylic acid anhydride represented the formula (IV):

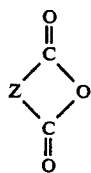

(IV)

wherein Z is a divalent radical selected from the group consisting of a monoaromatic radical which is substantially unsubstituted or substituted with a radical having no reactivity with amine or carboxylic acid anhydride and has from 5 to 15 carbons atoms, condensed polyaromatic radical or noncondensed aromatic radical connected to each other with a direct bond or a bridge member. Thus the present invention has been completed.

One aspect of the present invention is a polyimide which is blocked at the polymer terminal with dicarboxylic acid anhydride represented by the formula (IV):

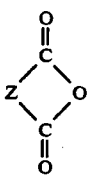

(IV)

wherein Z is the same as above, and has a fundamental skeleton represented by recurring structural units of the formula (III):

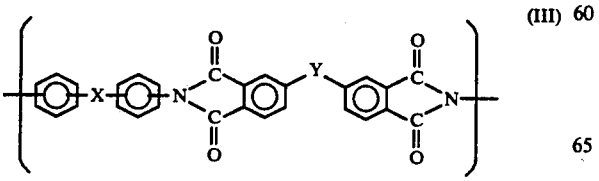

(III)

wherein X and Y are the same as above, in practice, has the fundamental skeleton represented by recurring structural units of the formula (V) or the formula (VI):

That is, the aspect is the polyimide which has both ether bonds and carbonyl bonds in the fundamental skeleton and has excellent heat stability and good processability.

Another aspect of the invention is a process for preparing the polyimide by reacting 1 mole of a diamine compound represented by the formula (VII):

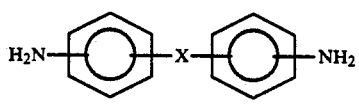

(VII)

wherein X is —O— or —CO—, with 0.8 to 1.0 mole of tetracarboxylic acid dianhydride represented by the formula (VIII):

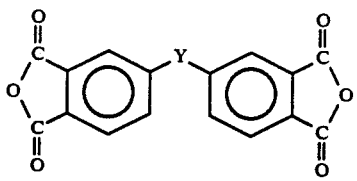

(VIII)

wherein Y is —O— or —CO— and differs from X in the formula (VII), that is, in practice, 3,3',4,4'-benzophenonetetracarboxylic dianhydride of the formula (VIII-a):

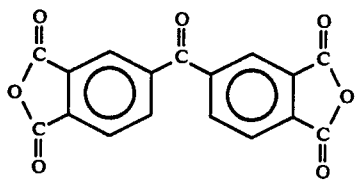

(VIII-a)

in combination with diaminodiphenyl ethers as an amine compound or 3,3',4,4'-diphenylethertetracarboxylic dianhydride of the formula (VIII-b):

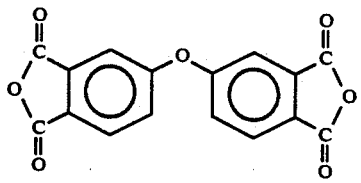

in combination with diaminobenzophenones as an amine compound, in the presence of 0.001 to 1.0 mole of dicarboxylic acid anhydride represented by the formula (IV):

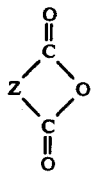

wherein Z is the same as above.

A further aspect of the present invention is a polyimide resin composition comprising 100 parts by weight of heat-stable polyimide which is blocked at the polymer terminal with dicarboxylic acid anhydride represented by the formula (IV):

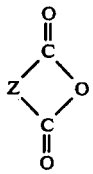

wherein Z is the same as above, and has a fundamental skeleton represented by recurring structural units of the formula (III):

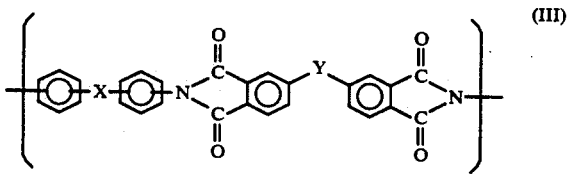

wherein X and Y are the same as above, and 5 to 100 parts by weight of fibrous reinforcement.

The polyimide obtained by the process of the invention has excellent melt-flow stability and remarkably improved processability as compared with conventionally known polyimide. The polyimide resin composition of the invention has a very high heat-distortion temperature and is also excellent in heat resistance, dimensional stability, thermal-oxidative stability and mechanical strength.

The polyimide of the invention is a favorable material for electric and electronic appliances, automobile parts and precision instrument members. Thus, the invention is very useful in industry.

DETAILED DESCRIPTION OF THE INVENTION

Figure 1:
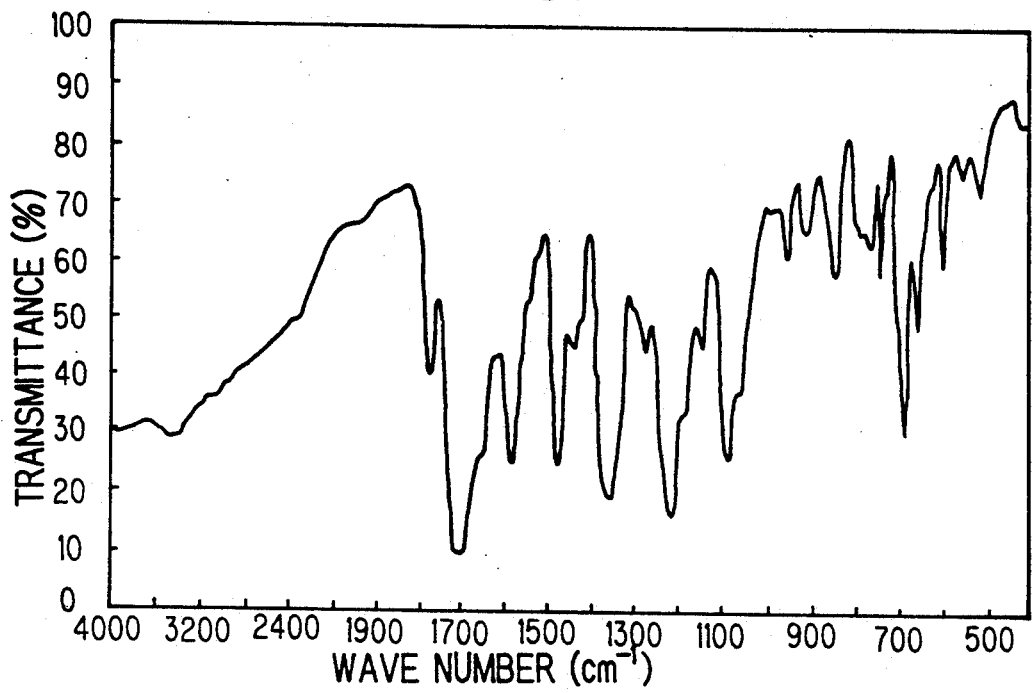
FIG. 1 is a drawing of an IR absorption spectrum of the polyimide powder obtained in Example 1.

The polyimide of the invention essentially consists of the fundamental skeleton represented by the formula (III):

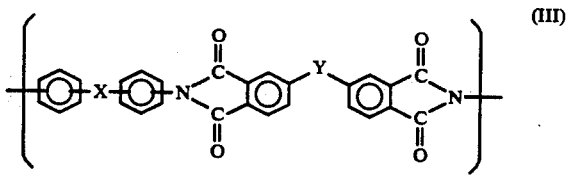

wherein X and Y are —O— or —CO— and differ each other and, in practice, essentially consists of the formula (III-a) or the formula (III-b):

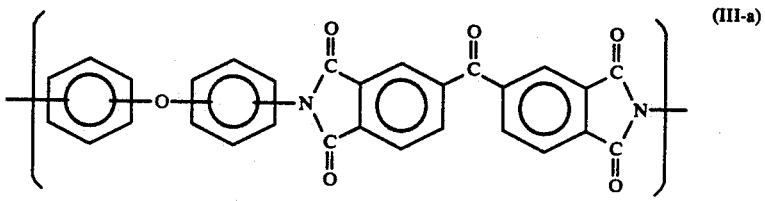

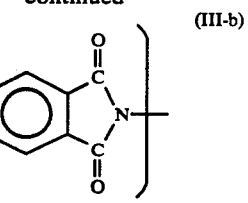

is blocked at the polymer terminal with dicarboxylic acid anhydride of the formula (IV):

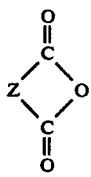

wherein Z is the same as above.

As clearly seen in the structural formulas illustrated in the above formula (III-a) and formula (III-b), the polyimide of the invention in characterized by having both ether bonds and carbonyl bonds in the fundamental skeleton and being blocked at the polymer terminal with dicarboxylic acid anhydride.

Such polyimide can be prepared by the process of the present invention which will be illustrated below.

The diamine compound for use in the preparation process of the invention is represented by the formula (VII):

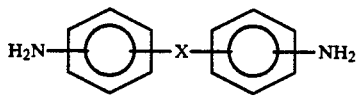

wherein X is —O— or —CO— and is, in practice, diaminodiphenyl ethers represented by the formula (VII-a):

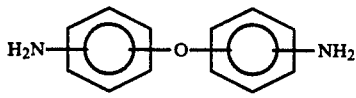

which include, for example, a single compound or a mixture of the compound selected from
4,4'-diaminodiphenyl ether, 3,3'-diaminodiphenyl ether, 2,2'-diaminodiphenyl ether, 2,3'-diaminodiphenyl ether, 2,4'-diaminodiphenyl ether and 3,4'-diaminodiphenyl ether.

Another type of diamine compound used is diaminobenzophenones represented by the formula (VII-b):

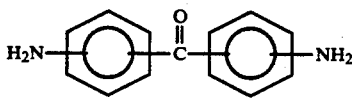

which include, for example, a single compound or a mixture of the compound selected from
2,2'-diaminobenzophenone,
2,3'-diaminobenzophenone, 2,4'-diaminobenzophenone, 4,4'-diaminobenzophenone, 3,4'-diaminobenzophenone and 3,3'-diaminobenzophenone.

The polyimide of the invention is prepared by using the above diaminodiphenyl ethers and diaminobenzophenones as the raw material. However, other diamines can also be used as a mixture of the above diamines in an amount imparting no adverse effect on the good properties of the polyimide.

Other diamines which can be used as a mixture include, for example,
m-phenylenediamine, o-phenylenediamine, p-phenylenediamine,
m-aminobenzylamine, p-aminobenzylamine,
bis(3-aminophenyl) sulfide,
(3-aminophenyl)(4-aminophenyl) sulfide,
bis(4-aminophenyl) sulfide,
bis(3-aminophenyl)sulfoxide,
(3-aminophenyl)(4-aminophenyl) sulfoxide,
bis(4-aminophenyl) sulfoxide,
bis(3-aminophenyl) sulfone,
(3-aminophenyl)(4-aminophenyl) sulfone,
bis(4-aminophenyl) sulfone,
3,3'-diaminodiphenylmethane,
3,4 -diaminodiphenylmethane,
4,4'-diaminodiphenylmethane,
bis [4-(3-aminophenoxy)phenyl] methane,
bis [4-(4-aminophenoxy)phenyl] methane,
1,1-bis [4-(3-aminophenoxy)phenyl] ethane,
1,1-bis [4-(4-aminophenoxy)phenyl] ethane,
1,2-bis [4-(3-aminophenoxy)phenyl] ethane,
1,2-bis [4-(4-aminophenoxy)phenyl] ethane,
2,2-bis [4-(3-aminophenoxy)phenyl]propane,
2,2-bis [4-(4-aminophenoxy)phenyl]propane,
2,2-bis [4-(3-aminophenoxy)phenyl]butane,
2,2-bis [4-(4-aminophenoxy)phenyl]butane,
2,2-bis [4-(3-aminophenoxy)phenyl]-1,1,1,3,3,3-hexafluoropropane,
2,2-bis [4-(4-aminophenoxy)phenyl]-1,1,1,3,3,3-hexafluoropropane,
1,3-bis(3-aminophenoxy)benzene,
1,3-bis(4-aminophenoxy)benzene,
1,4-bis(4-aminophenoxy)benzene,
4,4'-bis(3-aminophenoxy)biphenyl,
4,4'-bis(4-aminophenoxy)biphenyl,
bis [4-(3-aminophenoxy)phenyl] ketone,
bis [4-(4-aminophenoxy)phenyl] ketone,
bis [4-(3-aminophenoxy)phenyl] sulfide,
bis [4-(4-aminophenoxy)phenyl] sulfide,
bis [4-(3-aminophenoxy)phenyl] sulfoxide,
bis [4-(4-aminophenoxy)phenyl]sulfoxide,
bis [4-(3-aminophenoxy)phenyl]sulfone,
bis [4-(4-aminophenoxy)phenyl]sulfone,
bis [4-(3-aminophenoxy)phenyl]ether,
bis [4-(4-aminophenoxy)phenyl]ether,
1,4-bis [4-(3-aminophenoxy)benzoyl] benzene,
1,3-bis [4-(3-aminophenoxy)benzoyl] benzene,
4,4'-bis [4-(3-aminophenoxy)benzoyl] diphenyl ether, 4,4'-bis [3-(3-aminophenoxy)benzoyl] diphenyl ether,
4,4'-bis [4-(4-amino-α,α-dimethylbenzyl)phenoxy] benzophenone,
4,4'-bis [4-(4-amino-α,α-dimethylbenzyl)phenoxy] diphenyl sulfone,
bis [4- {4-(4-aminophenoxy)phenoxy}phenyl]sulfone,
1,4-bis [4-(4-aminophenoxy)-α,α'-dimethylbenzene and
1,3-bis [4-(4-aminophenoxy)-α,α'-dimethylbenzene.
These diamines can be used singly or as a mixture.

The diamine compounds of the formula (VII-a) and the formula (VII-b) can of course be used as a mixture as long as imparting no adverse effect on the properties of the resulting polyimide.

The tetracarboxylic acid dianhydride used for the process of the invention is represented by the formula (VIII):

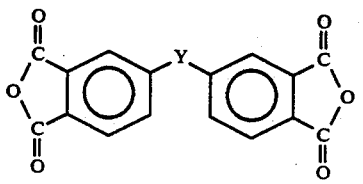

(VIII)

wherein Y is —O— or —CO—, and is, in practice, 3,3',4,4'-benzophenonetetracarboxylic dianhydride of the formula (VIII-a):

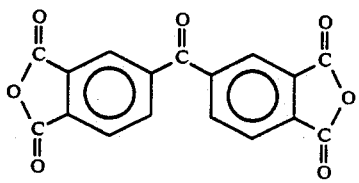

(VIII-a)

or 3,3',4,4'-diphenylethertetracarboxylic dianhydride of the formula (VIII-b):

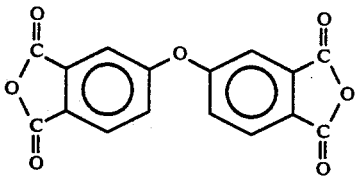

(VIII-b)

When diaminodiphenyl ethers are used as a diamine compound, 3,3,4,4'-benzophenonetetracarboxylic dianhydride is employed. When diaminobenzophenones are used, 3,3',4,4'-diphenylethertetracarboxylic acid dianhydride is employed. However, a mixture of these diamine compounds and/or a mixture of these dianhydrides can also be used as long as imparting no adverse effect on the good properties of the polyimide.

The above tetracarboxylic acid dianhydride is used for the preparation of polyimide of the invention. However, other tetracarboxylic acid dianhydrides can also be used as a mixture in an amount which retains the good properties of the polyimide.

Other tetracarboxylic acid dianhydrides which can be used as a mixture include, for example,
ethylenetetracarboxylic dianhydride,
butanetetracarboxylic dianhydride,
cyclopentanetetracarboxylic dianhydride,
pyromellitic dianhydride,
2,2',3,3'-benzophenonetetracarboxylic dianhydride,
3,3',4,4'-biphenyltetracarboxylic dianhydride,
2,2',3,3'-biphenyltetracarboxylic dianhydride,
2,2-bis(3,4-dicarboxyphenyl)propane dianhydride,
2,2-bis(2,3-dicarboxyphenyl)propane dianhydride,
2,2-bis(3,4-dicarboxyphenyl)-1,1,1,3,3,3-hexafluoropropane dianhydride,
2,2-bis(2,3-dicarboxyphenyl)-1,1,1,3,3,3-hexafluoropropane dianhydride,
bis(2,3-dicarboxyphenyl)ether dianhydride,
bis(3,4-dicarboxyphenyl)ether dianhydride,
bis(3,4-dicarboxyphenyl)sulfone dianhydride,
bis(2,3-dicarboxyphenyl)sulfone dianhydride,
1,1-bis(2,3-dicarboxyphenyl)ethane dianhydride,
bis(2,3-dicarboxyphenyl)methane dianhydride,
bis(3,4-dicarboxyphenyl)methane dianhydride,
4,4'-(p-phenylenedioxy)diphthalic dianhydride,
4,4'-(m-phenylenedioxy)diphthalic dianhydride,
2,3,6,7-naphthalenetetracarboxylic dianhydride,
1,4,5,8-naphthalenetetracarboxylic dianhydride,
1,2,5,6-naphthalenetetracarboxylic dianhydride,
1,2,3,4-benzenetetracarboxylic dianhydride,
3,4,9,10-perylenetetracarboxylic dianhydride,
2,3,6,7-anthracenetetracarboxylic dianhydride and
1,2,7,8-phenanthrenetetracarboxylic dianhydride.
These dianhydrides can be used singly or in combination.

The tetracarboxylic acid dianhydride of the formula (VIII-a) and the formula (VIII-b) can of course be used as a mixture as long as imparting no adverse effect on the properties of the resulting polyimide.

The process of the invention is carried out by reacting the above diamine compound with tetracarboxylic acid dianhydride in the presence of dicarboxylic acid anhydride represented by the formula (IV):

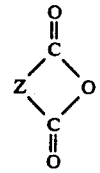

(IV)

wherein Z is the same as above.

Exemplary dicarboxylic acid anhydrides which can be used in the process include
2,3-benzophenone dicarboxylic anhydride,
3,4-benzophenone dicarboxylic anhydride,
2,3-dicarboxyphenyl phenyl ether anhydride,
3,4-dicarboxyphenyl phenyl ether anhydride,
2,3-biphenyldicarboxylic anhydride,
3,4-biphenyldicarboxylic anhydride,
2,3-dicarboxyphenyl phenyl sulfone anhydride,
3,4-dicarboxyphenyl phenyl sulfone anhydride,
2,3-dicarboxyphenyl phenyl sulfide anhydride,
3,4-dicarboxyphenyl phenyl sulfide anhydride,
1,2-naphthalenedicarboxylic anhydride,
2,3-naphthalenedicarboxylic anhydride,
1,8-naphthalenedicarboxylic anhydride,
1,2-anthracenedicarboxylic anhydride,
2,3-anthracenedicarboxylic anhydride and
1,9-anthracenedicarboxylic anhydride.
These anhydrides can be used singly or as a mixture.

The amount of tetracarboxylic acid dianhydride of the formula (VIII) which is used in the process of the invention is from 0.8 to 1.0 mole per mole of the diamine compound of the formula (VII), preferably from 0.90 to 0.99 mole in view of thermal-oxidative stability and processing ability of the resultant polyimide.

The amount of phthalic anhydride of the formula (IV) which is used in the invention is from 0.001 to 1.0 moles per mole of the diamine compound of the formula (VII). An amount less than 0.001 mole leads to viscosity increase in processing at high temperatures and causes deterioration of processing ability. An amount exceeding 1.0 mole lowers mechanical strength. Preferred amounts are from 0.001 to 0.5 mole per mole of the diamine compound.

No particular restriction is imposed upon the reaction medium in the process of the invention. It is preferred to carry out the reaction in an organic solvent. Exemplary organic solvents which can be used include N,N-dimethylformamide, N,N-dimethylacetamide, N,N-diethylacetamide, N,N-dimethylmethoxyacetamide, N-methyl-2-pyrrolidone, 1,3-dimethyl-2-imidazolidinone, N-methylcaprolactan, 1,2-dimethoxyethane, bis(2-methoxyethyl)ether, 1,2-bis(2-methoxyethoxy)ethane, bis [2-(2-methoxyethoxy)ethyl] ether, tetrahydrofuran, 1,3-dioxane, 1,4-dioxane, pyridine, picoline, dimethyl sulfoxide, dimethyl sulfone, tetramethylurea, hexamethylphosphoramide, phenol, o-cresol, m-cresol, p-cresol, m-cresylic acid, p-chlorophenol and anisole. These organic solvents can be used singly or as a mixture.

In the practice of the invention, the diamine compound of the formula (VII), tetracarboxylic dianhydride of the formula (VIII) and dicarboxylic acid anhydride are added to the organic solvent and the reaction is carried out. Any of the following addition procedures can be conducted for the reaction.

(a) After reacting 3,3',4,4'-benzophenonetetracarboxylic dianhydride or 3,3',4,4'-diphenylethertetracarboxylic dianhydride with diaminodiphenyl ether or diaminobenzophenone, dicarboxylic acid anhydride is added and the reaction is continued.

(b) After reacting diaminodiphenyl ether or diaminobenzophenone with dicarboxylic acid anhydride, 3,3',4,4'-benzophenonetetracarboxylic dianhydride or 3,3',4,4'-diphenylethertetracarboxylic dianhydride is added and the reaction is continued.

(c) 3,3',4,4'-Benzophenonetetracarboxylic dianhydride or 3,3',4,4'-diphenylethertetracarboxylic dianhydride, diaminodiphenyl ether or diaminobenzophenone, and dicarboxylic acid anhydride are added at the same time and the reaction is successively carried out.

The reaction temperature is usually 250° C. or less, preferably 50° C. or less.

No particular limitation is placed on the reaction pressure and atmospheric pressure is sufficient to carry out the reaction.

The reaction time differs depending upon kind of diamino-diphenyl ether, kind of solvent and reaction temperature, and is usually from 4 to 24 hours to complete the reaction.

The resulting polyamic acid is further imidized by heating at 100° to 400° C. or chemically imidized by using an imidizing agent such as acetic anhydride to obtain polyimide which has recurring structural units corresponding to the polyamic acid.

In an alternative process, 3,3',4,4'-benzophenonetetracarboxylic dianhydride or 3,3',4,4'-diphenylethertetracarboxylic dianhydride, diaminodiphenyl ether or diaminobenzophenone, and dicarboxylic acid anhydride are dissolved or suspended in the organic solvent and successively heated to carry out formation and imidization of the polyamic acid precursor at the same time. Thus the desired polyimide can also be prepared. That is, film or powder of the polyimide can be obtained by using conventionally known procedures.

The polyimide of the invention can be prepared by reacting the above raw materials through the above process under the above reaction conditions and by successively imidizing the resultant polyamic acid. The polyamic acid which is the precursor of polyimide has, for example, an inherent viscosity of 0.1 to 3.0 dl/g at 35° C. in a N,N-dimethylacetamide solvent at a concentration of 0.5 g/100ml.

In the melt processing of polyimide of the invention, suitable amounts of other thermoplastic resins can also be blended depending upon the object for use unless impairing the object of the invention.

Other thermoplastic resins which can be blended include, for example, polyethylene, polypropylene, polycarbonate, polyarylate, polyamide, polysulfone, polyether sulfone, polyether ketone, polyphenylene sulfide, polyamideimide, polyetherimide and modified polyphenylene oxide.

Fillers which are commonly used for thermoplastic resin compositions can also be used as long as imparting no adverse effect on the object of the invention. Exemplary fillers include, graphite, carborundum, silica powder, molybdenum disulfide, fluoro resin and other abrasion resistance improvers; glass fiber, carbon fiber, boron fiber, silicon carbide base fiber, carbon whisker, asbestos, metallic fiber, ceramic fiber and other reinforcements; antimony trioxide, magnesium carbonate, calcium carbonate and other flame retardants; clay, mica and other electrical property improvers; asbestos, silica, graphite and other tracking resistance improvers; barium sulfate, silica, calcium metasilicate and other acid resistance improvers; iron powder, zinc powder, aluminum powder, copper powder and other thermal conductivity improvers; and other miscellaneous materials such as glass beads, glass spheres, talc, diatomaceous earth, alumina, silicate balloons, hydrated alumina, metal oxides and coloring materials.

The polyimide of the invention can be used as a mixture with other thermoplastic resins and fillers. Particularly, compositions comprising the polyimide and a fibrous reinforcement exhibit excellent properties.

Exemplary reinforcements which can be used for the compositions of the invention include glass fiber, carbon fiber, potassium titanate fiber, aromatic polyamide fiber, silicon carbide fiber, alumina fiber, boron fiber, ceramic fiber and other known inorganic and organic fibers. Particularly preferred fibers are glass fiber, carbon fiber, potassium titanate fiber and aromatic polyamide fiber.

The term "glass fiber" means a fine monofilament which is obtained by stretch-quenching molten glass to a prescribed diameter by various methods, the strand which is obtained by collecting the monofilament with a collecting agent, and roving which is obtained by uniformly paralleling the strand. Any type of the glass fiber can be used for the invention. In order to provide affinity for the substrate resin of the invention, the glass fiber can be treated with silane coupling agents such as aminosilane and epoxysilane and surface treating agents such as chromic chloride.

The length of the glass fiber provides a remarkable effect on the properties of molded products and workability in the processing stage.

When the length of the glass fiber is increased, the properties of the molded products are improved and, on the contrary, workability in the processing stage becomes poor. Consequently, the length of glass fiber in the invention is preferably in the range of from 0.1 to 6 mm, more preferably from 0.3 to 4 mm in view of properties of the molded product and workability in processing.

The carbon fiber for use in the composition of the invention is obtained by carbonizing polyacrylonitrile, petroleum pitch and other raw materials and has a high elastic modulus and a high strength. Diameter and aspect ratios (length/diameter ratio) of the carbon fiber are selected in view of reinforcing effect and mixing ability. The diameter of the carbon fiber is preferably from 5 to 20 μm, more preferably from 8 to 15 μm. The aspect ratio is usually from 1 to 600, preferably from 100 to 350 μm particularly in view of mixing ability and reinforcing effect. An aspect ratio lower than the above range exhibits no reinforcing effect. An aspect ratio higher than the above range leads to poor mixing ability and good molded products cannot be obtained. The surface of the carbon fiber can be treated according to the object for use with epoxy resin, polyamide resin, polycarbonate resin, polyacetal resin and other conventionally known surface treating agents.

The potassium titanate fiber used in the composition of the invention is a kind of high-strength fiber (whisker) having a chemical composition $K_2O \cdot 6H_2O$ and $K_2O \cdot 6H_2O \cdot \frac{1}{2}H_2O$. The whisker is a needle crystal and has a typical melting point of from 1300 to 1350° C. Average fiber length is usually from 5 to 50 μm, preferably from 20 to 30 μm. Average fiber diameter is usually from 0.05 to 1.0μm, preferably from 0.1 to 0.3 μm. Untreated potassium titanate fiber can be usually used. However, in order to provide affinity for the substrate resin of the invention, the surface of the potassium titanate fiber can be treated according to the object for use with silane coupling agents such as aminosilane and epoxysilane and other surface treating agents such as chromic chloride.

The aromatic polyamide fiber which can be used in the invention is a heat resistant organic fiber which has been developed recently. Representative polyamide fibers include, for example, KEVLAR (Trade mark of E. I. Du Pont de Nemours & Co.) having the formula (1):

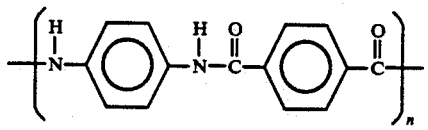

NOMEX (Trade mark of E. I. Du Pont de Nemours & Co.) having the formula (2):

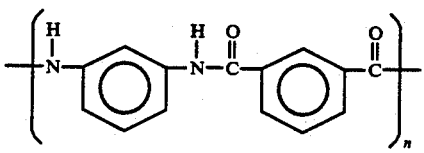

CONEX (Trade mark of Teijin) having the formula (3):

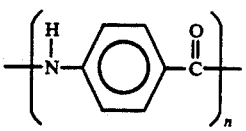

and other aromatic polyamide fibers composed of various skeletons having ortho-, meta- and para-located isomer structures. Particularly, the aromatic polyamide fiber of the formula (1) having para- and para-located bonds has a high softening point and a melting point and is thus most suitable as a heat resistant organic fiber for the invention.

The fibrous reinforcement in the composition of the invention is used in an amount of from 5 to 100 parts by weight, preferably from 10 to 50 parts by weight for 100 parts by weight of the polyimide resin. An amount less than 5 parts by weight cannot provide a reinforcing effect. On the contrary, an amount exceeding 100 parts by weight decreases flowability of the composition in the processing step and a satisfactory product becomes difficult to obtain.

The polyimide resin composition of the invention can be usually prepared by known processes and the following processes are particularly preferred.

(1) Polyimide powder and fibrous reinforcement are premixed in a mortar, Henschel mixer, drum blender, tumbling mixer, ball mill or ribbon blender, melt-mixed, kneaded with a hot roll and pelletized or crushed into powder.

(2) Polyimide powder is previously dissolved or suspended in an organic solvent, fibrous reinforcement is immersed in the resulting solution or suspension, the organic solvent is successively removed by heating in a hot-air oven, and the residual mass is pelletized or crushed into powder.

Exemplary organic solvents which can be used include N,N-dimethylformamide, N,N-dimethylacetamide, N,N-diethylacetamide, N,N-dimethylmethoxyacetamide, N-methyl-2-pyrrolidone, 1,3-dimethyl-2-imidazolidinone, N-methylcaprolactam, 1,2-dimethoxyethanebis(2-methoxyethyl)ether, 1,2-bis(2-methoxyethoxy)ethane, bis [2-(2-methoxyethoxy)ethyl]ether, tetrahydrofuran, 1,3-dioxane, 1,4-dioxane, pyridine, picoline, dimethyl sulfoxide, dimethyl sulfone, tetramethylurea, hexamethylphosphoramide, phenol, o-cresol, m-cresol, p-cresol, m-cresylic acid, p-chlorophenol and anisole. These organic solvents can be used singly or as a mixture.

(3) The polyamic acid which is the precursor of polyimide of the invention is dissolved in the above organic solvent, fibrous reinforcement is immersed in the resulting solution. The mixture is heat-treated at 100° to 400° or chemically imidized by using a conventional imidizing agent and the solvent is successively removed. The residue is pelletized or crushed into powder.

A single auxiliary agent or a mixture of the agent selected from antioxidant, heat stabilizer, UV absorber, flame retardant, antistatic agent, lubricant, colorant or other common additives can be added to the composition of the invention unless impairing the object of the invention.

Other resins and fillers which can be added in a suitable amount depending upon the object of the invention include, for example, thermoplastic resins such as polyethylene, polypropylene, polyamide, polyamidimide, polyetherimide, polycarbonate, polyarylate, polysulfone polyether sulfone, polyether ketone, polyether ether ketone, modified polyphenylene oxide and polyphenylene sulfide; thermosetting resins such as phenolic resin and epoxy resin; and fillers such as clay, mica, silica, graphite, glass beads, alumina and calcium carbonate.

The polyimide resin composition can be applied to practical use by processing with known methods such as injection molding, extrusion, compression molding and rotational molding.

The present invention will hereinafter be illustrated further in detail by way of examples and comparative examples.

Physical properties in the examples and comparative examples were measured by the following methods.

Tg, Tc, Tm:
Measured with DSC(Shimadzu DT-40, Series DSC-41M).

5% weight loss temperature:
Measured with DTG(Shimadzu DT-40, Series DTG-40M) in the air.

Melt viscosity:
Measured with Shimadzu-Koka Type Flow Tester CFT 500A under 100 kg load by using an orifice of 1 mm in diameter, 10 mm in length.

Inherent viscosity:
Inherent viscosity of polyimide was measured at 35° C. with a solution containing 0.50 g of polyimide powder in 100 ml of a solvent mixture composed of p-chlorophenol/phenol (9/1 by weight).

Weight loss behavior at constant temperature:
Polyimide powder was allowed to stand in an air oven at 350° C. and weight loss was measured.

EXAMPLE 1

To a reaction vessel equipped with a stirrer, reflux condenser, water separator and a nitrogen inlet tube, 30.0 g (0.15 mole) of 3,3'-diaminodiphenyl ether, 46.4 g (0.144 mole) of 3,3',4,4'-benzophenonetetracarboxylic dianhydride, 1.78 g (0.012 mole) of phthalic anhydride, 2.09 g of γ-picoline and 305 g of m-cresol were charged. The mixture was heated to 145° C. with stirring in a nitrogen atmosphere while distilling out about 5 ml of water. The reaction was carried out at 140° to 150° C. for 4 hours. The reaction mixture obtained was cooled to the room temperature and poured into about 2.5 l of methyl ethyl ketone. Precipitated polyimide was filtered, washed with methyl ethyl ketone and dried at 180° C. for 24 hours under reduced pressure. Polyimide powder thus obtained was 71.8 g (98.6% yield) and had an inherent viscosity of 0.50 dl/g, glass transition temperature (Tg) of 221° C. and 5% weight loss temperature of 555° C. in air.

IR absorption spectrum of the polyimide powder is illustrated in FIG. 1. The spectrum remarkably indicates characteristic absorption bands of imide at around 1780 cm$^{-1}$ and 1720 cm$^{-1}$, and characteristic absorption bands of ether bond at around 1240 cm$^{-1}$.

Results of elemental analysis are as follows.

| | Elemental analysis | | |
|---|---|---|---|
| | C | N | H |
| Calculated (%) | 71.66 | 5.77 | 2.90 |
| Found (%) | 71.61 | 5.70 | 2.87 |

Melt viscosity of the polyimide powder was 8500 poise at 400° C. The strand obtained was light yellow and very flexible.

Figure 2:
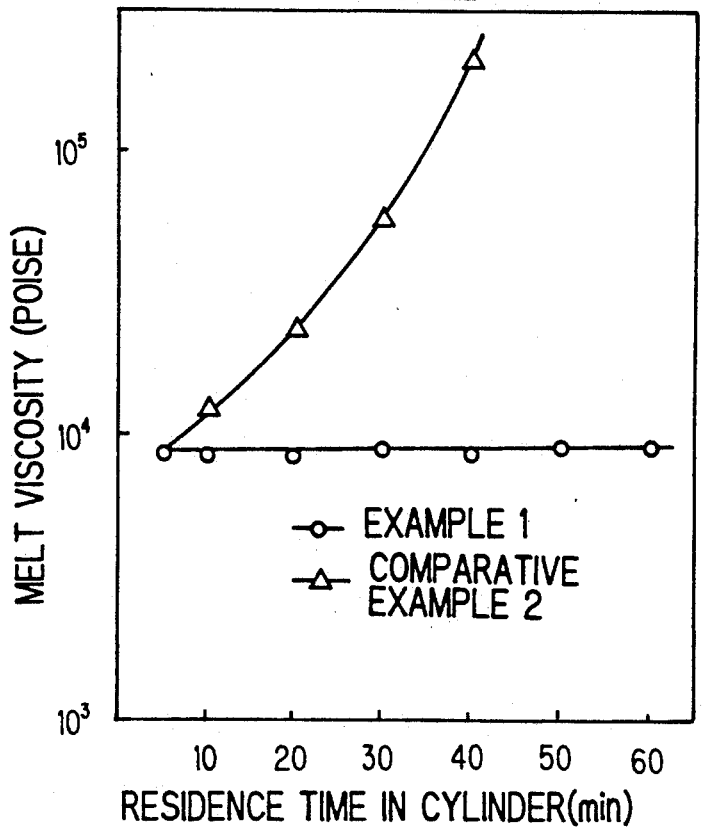
FIG. 2 illustrates results on comparing the processing stability of the polyimide powder obtained in Example 1 and Comparative Example 2. Processing stability was measured by varying the residence time of the powder in the cylinder of a flow tester at temperature of 400° C. under load of 100 kg.

Processing stability of the polyimide powder was measured by varying residence time in the cylinder of a flow tester at 400° C. under 100 kg load. Results are illustrated in FIG. 2. Even though residence time in the cylinder was extended, melt viscosity was almost constant. Thus processing stability was good.

COMPARATIVE EXAMPLE 1

To the same reaction vessel as used in Example 1, 30.0 g (0.15 mole) of 3,3'-diaminodiphenyl ether, 31.4 g (0.144 mole) of pyromellitic dianhydride, 1.78 g (0.012 mole) of phthalic anhydride, 2.09 g of γ-picoline and 253 g of m-cresol were charged. The same procedures as described in Example 1 were carried out to obtain 57.2 g (99% yield) of polyimide powder. The polyimide powder had no distinct glass transition temperature and no flow at all at 400° C.

COMPARATIVE EXAMPLE 2

The procedures described in Example 1 were carried out without using phthalic anhydride. Polyimide powder thus obtained had Tg of 220° C. and inherent viscosity of 0.50 dl/g. Variation of melt viscosity was measured by the same procedures as Example 1. Melt viscosity increased with extended residence time and indicated inferior processing stability to the polyimide of Example 1.

EXAMPLE 2

To the same reaction vessel as used in Example 1, 30.0 g (0.15 mole) of 4,4'-diaminodiphenyl ether, 45.4 g (0.141 mole) of 3,3',4,4'-benzophenonetetracarboxylic dianhydride, 2.66 g (0.018 mole) of phthalic anhydride, 2.09 g of γ-picoline and 312 g of m-cresol were charged. The mixture was heated to 145° C. with stirring in a nitrogen atmosphere while distilling out about 5 ml of water. The reaction was carried out at 140° to 150° C. for 4 hours. The reaction mixture obtained was cooled to the room temperature and poured into about 2.5 l of methyl ethyl ketone. Precipitated polyimide was filtered, washed with methyl ethyl ketone and dried at 180° C. for 24 hours under reduced pressure. Polyimide powder thus obtained was 71.6 g (98.5% yield) and had an inherent viscosity of 0.50 dl/g, glass transition temperature (Tg) of 254° C., crystallization temperature (Tc) of 380° C., crystal melting point (Tm) of 437° C., and 5% weight loss temperature of 558° C. in the air.

Figure 3:
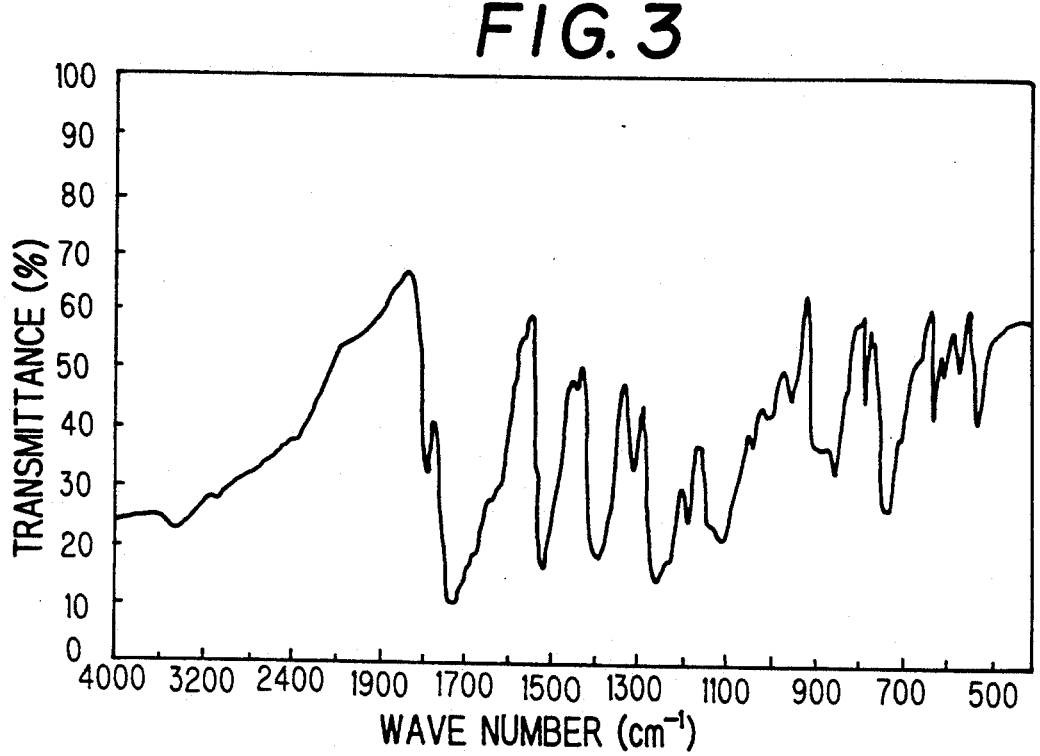
FIG. 3 and FIG. 4 are drawings of IR absorption spectrum of the polyimide powder obtained in Example 2 and Example 3, respectively.

IR absorption spectrum of the polyimide powder is illustrated in FIG. 3. The spectrum remarkably indicates characteristic absorption bonds of imide at around 1780 cm$^{-1}$ and 1720 cm$^{-1}$, and characteristic absorption bands of ether bond at around 1240 cm$^{-1}$.

Results of elemental analysis are as follows.

| | Elemental analysis | | |
|---|---|---|---|
| | C | N | H |
| Calculated (%) | 71.69 | 5.78 | 2.91 |
| Found (%) | 71.73 | 5.72 | 2.93 |

The polyimide powder was insoluble in halogenated hydrocarbon solvents such as methylene chloride and chloroform.

EXAMPLE 3

The same procedures as described in Example 1 were carried out except that 3,3'-diaminodiphenyl ether was replaced by 3,4'-diaminodiphenyl ether. Polyimide powder obtained was 71.4 g (98% yield) and had an inherent viscosity of 0.48dl/g, Tg of 240° C. and 5% weight loss temperature of 555° C. in the air.

Figure 4:
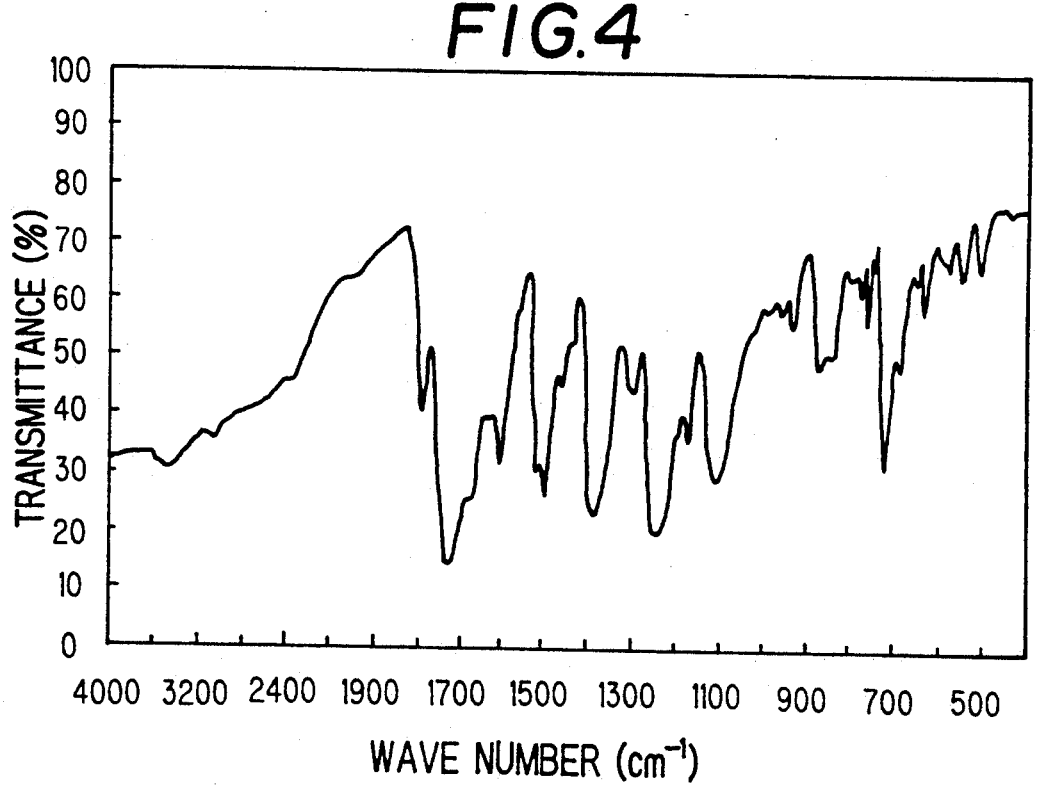

IR absorption spectrum of the polyimide powder is illustrated in FIG. 4. The spectrum remarkably indicates characteristic absorption bands of imide at around 1780 cm$^{-1}$ and 1720 cm$^{-1}$, and characteristic absorption bands of ether bond at around 1240 cm$^{-1}$.

Results of elemental analysis are as follows.

|  | Elemental analysis | | |
| --- | --- | --- | --- |
|  | C | N | H |
| Calculated (%) | 71.66 | 5.77 | 2.90 |
| Found (%) | 71.69 | 5.72 | 2.93 |

Melt viscosity of the polyimide powder was 9700 poise at 430° C. The strand obtained was red brown, transparent and very flexible.

EXAMPLE 4

To a reaction vessel equipped with a stirrer, reflux condenser and a nitrogen inlet tube, 12.00 g (0.06 mole) of 4,4'-diaminodiphenyl ether and 177.4 g of N,N-dimethylacetamide were charged. To the mixture, 19.13 g (0.0594 mole) of 3,3',4,4'-benzophenonetetracarboxylic dianhydride was added by portions under stirring in a nitrogen atmosphere with caution to prevent temperature rise of the solution. Stirring was continued for about 20 hours at the room temperature. Thereafter 0.178 g (1.2×10$^{-3}$ mole) of phthalic anhydride was added and stirring was further continued for 3 hours.

Polyamic acid thus obtained had an inherent viscosity of 1.5 dl/g. The inherent viscosity of polyamic acid was measured at 35° C. in a solution containing 0.5 g of polyamic acid in 100 ml of N,N-dimethylacetamide solvent.

A portion of the polyamic acid solution was cast on a glass plate and heated for an hour each at 100° C., 200° C. and 250° C., respectively. The polyimide film thus obtained had a thickness of about 50 μm, tensile strength of 15.3 kg/mm$^2$, tensile elastic modulus of 330 kg/mm$^2$ and elongation of 10.6%.

EXAMPLE 5

The same procedures as described in Example 4 were carried out by using the same reaction vessel, except that 4,4'-diaminodiphenyl ether was replaced by 3,4'-diaminodiphenyl ether.

Polyamic acid solution thus obtained had an inherent viscosity of 1.38 dl/g. A polyimide film having a thickness of 50 μm was prepared from the polyamic acid solution by carrying out the same procedures as described in Example 4. The polyimide film had a tensile strength of 15.9 kg/mm$^2$, tensile elastic modulus of 345 kg/mm$^2$ and elongation of 8.5%.

EXAMPLE 6

The same procedures as described in Example 4 were carried out by using the same reaction vessel, except that 4,4'-diaminodiphenyl ether was replaced by 3,4'-diaminodiphenyl ether. The polyamic acid solution thus obtained had an inherent viscosity of 1.17 dl/g. A polyimide film having a thickness 50 μm was prepared from the polyamic acid solution by carrying out the same procedures as described in Example 4. The polyimide film had a tensile strength of 17.3 kg/mm$^2$, tensile modulus of 365 kg/mm$^2$ and elongation of 7.5%.

EXAMPLE 7

To the same reaction vessel as used in Example 1, 6.36 g (0.03 mole) of 3,3'-diaminobenzophenone, 9.04 g (0.029 mole) of 3,3',4,4'-diphenylethertetracarboxylic dianhydride, 0.249 g (0.00168 mole) of phthalic anhydride, 0.42 g (0.0045 mole) of γ-picoline and 61.6 g of m-cresol were charged. The mixture was heated to 150° C. with stirring in a nitrogen atmosphere. The reaction was carried out at 150° C. for 4 hours while distilling out 1 ml of water.

The reaction mixture obtained was cooled to the room temperature and poured into about 150 g of methyl ethyl ketone. Precipitated polyimide was filtered, washed with methyl ethyl ketone and dried at 50° C. for 12 hours in the air and at 220° C. for 4 hours in nitrogen atmosphere. Polyimide powder thus obtained was 14.0 g (96.1% yield) and had an inherent viscosity of 0.51 dl/g and a glass transition temperature (Tg) of 225° C.

Figure 5:
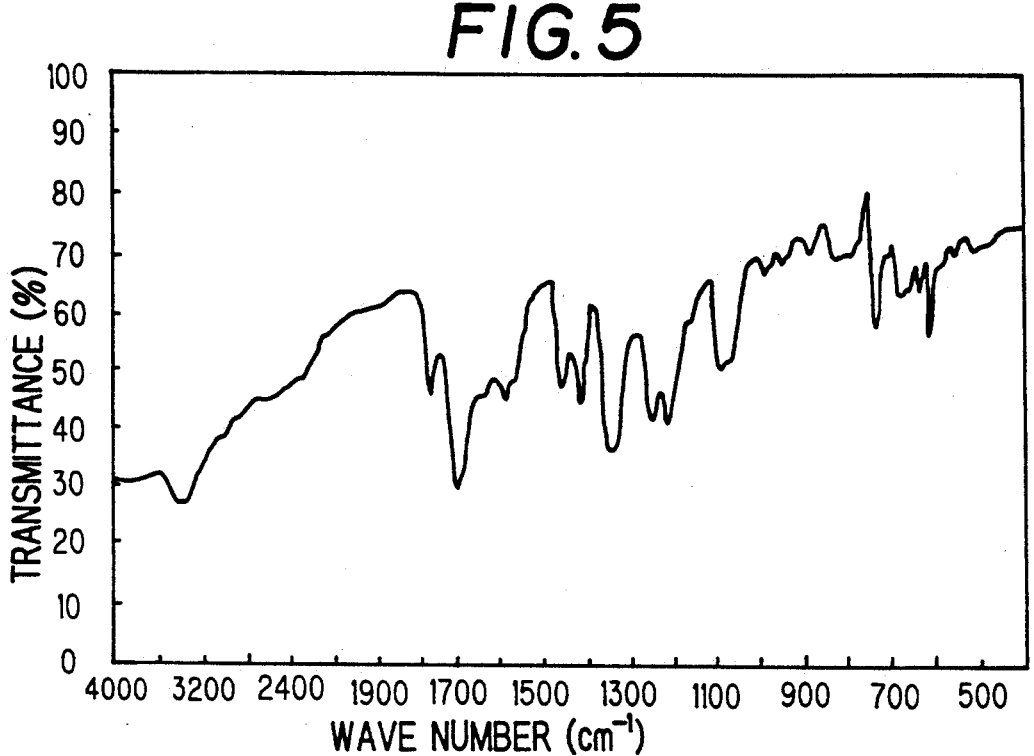
FIG. 5 is a drawing of an IR absorption spectrum of the powder obtained in Example 7.

IR absorption spectrum of the polyimide powder is illustrated in FIG. 5. The spectrum remarkably indicates characteristic absorption bands of imide at around 1780 cm$^{-1}$ and 1720 cm$^{-1}$.

Results of elemental analysis are as follows.

|  | Elemental analysis | | |
| --- | --- | --- | --- |
|  | C | N | H |
| Calculated (%) | 71.66 | 5.77 | 2.89 |
| Found (%) | 71.31 | 5.79 | 2.92 |

Melt viscosity of the polyimide powder was 7500 poise at 370° C. The strand obtained was red brown, transparent and very flexible.

Figure 6:
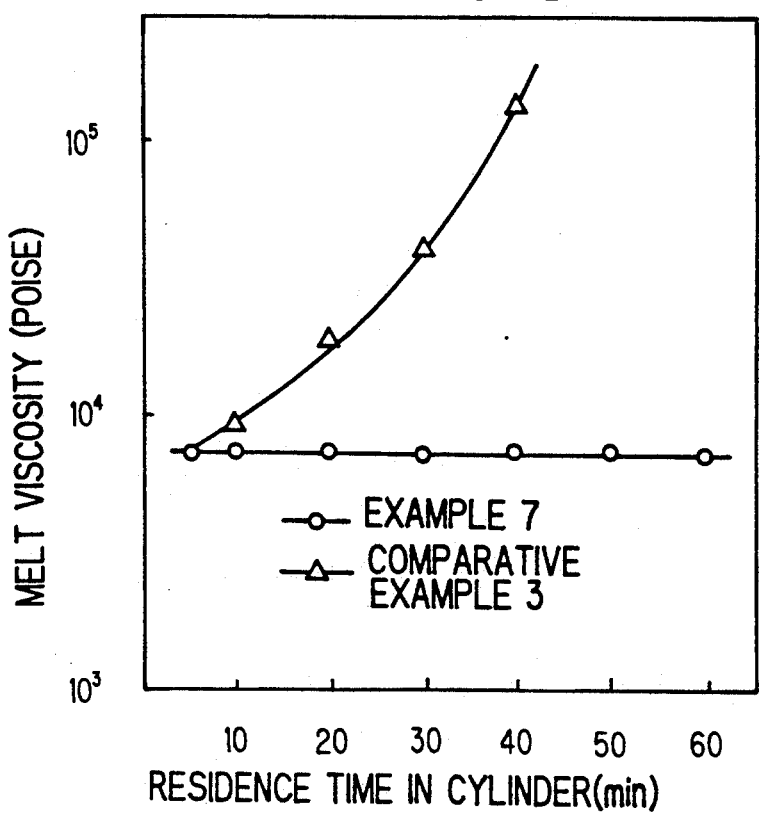
FIG. 6 illustrates results on comparing the processing stability of the polyimide powder obtained in Example 7 and Comparative Example 3. Processing stability was measured by variating the residence time of the powder in the cylinder of a flow tester at temperature of 370° C. under load of 100 kg.

Processing stability of the polyimide powder was measured by varying residence time in the cylinder of a flow tester at 370° C. under 100 kg load. Results are illustrated in FIG. 6. Even though residence time in the cylinder was extended, melt viscosity was almost constant. Thus processing stability was good.

Figure 7:
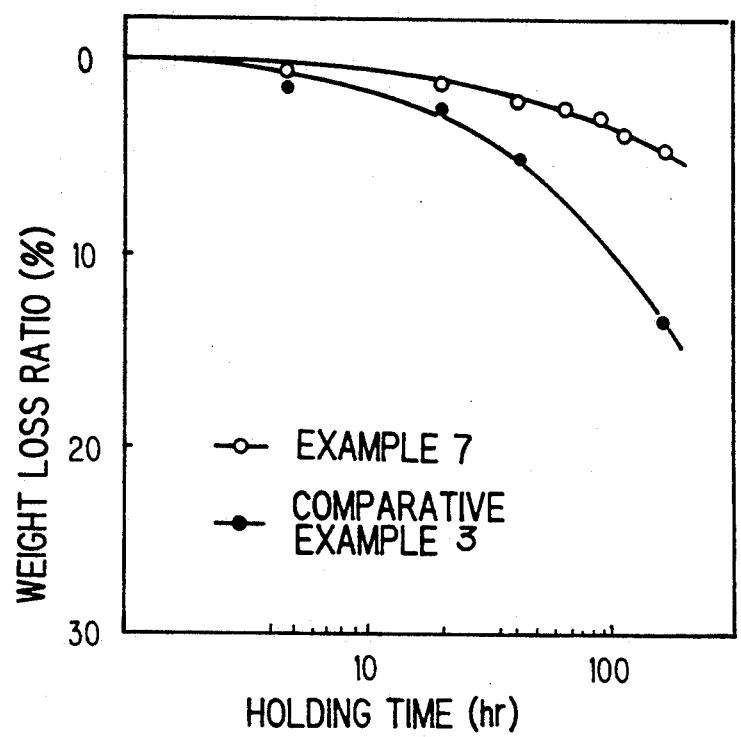
FIG. 7 is a drawing illustrating the results on comparing the thermal-oxidative stability of the polyimide powder obtained in Example 7 and Comparative Example 3. Thermal-oxidative stability was measured by weight loss ratio of the powder when holding time was changed at temperature of 350° C. in the air.

Thermal-oxidative stability of the polyimide powder thus obtained was measured through weight loss ratio by changing the retention time in a hot air oven at 350° C. Results are shown in FIG. 7.

COMPARATIVE EXAMPLE 3

The same procedures as described in Example 7 were carried out without addition of phthalic anhydride. Polyimide powder thus obtained was 13.75 g (96% yield) and had an inherent viscosity of 0.5 dl/g and a glass transition temperature (Tg) of 225° C.

Processing stability of polyimide powder thus obtained was measured by varying the residence time in the cylinder of the flow tester as conducted in Example 7. Results are illustrated in FIG. 6 together with the results of Example 7.

As seen in FIG. 6, melt viscosity of thus-obtained polyimide increases with prolonged residence time and indicates inferior processing stability as compared with that of polyimide obtained in Example 7.

Thermal-oxidative stability of the polyimide powder thus obtained was measured through weight loss ratio by changing the retention time in a hot air oven at 350° C. as conducted in Example 7. Results are illustrated in FIG. 7 together with the results of Example 7. As seen in FIG. 7, weight loss ratio of the thus-obtained polyimide powder increases with extended retention time. Consequently, the thus-obtained polyimide powder has inferior thermal-oxidative stability as compared with that of polyimide obtained in Example 7.

COMPARATIVE EXAMPLE 4

To the same reaction vessel as used in Example 7, 12.12 g (0.06 mole) of 3,3'-diaminobenzophenone, 18.55 g (0.058 mole) of 3,3',4,4'-benzophenonetetracarboxylic dianhydride, 0.710 g (0.0048 mole) of phthalic anhydride, 0.84 g (0.009 mole) of γ-picoline and 125 g of m-cresol were charged. The mixture was heated to 150° C. with stirring in a nitrogen atmosphere at a temperature increase rate of 1° C./min. The reaction was carried out at 150° C. for 4 hours while distilling out 2 ml of water. The reaction mixture obtained was cooled to the room temperature and poured into about 300 g of methyl ethyl ketone. Precipitated polyimide was filtered, washed with methyl ethyl ketone and dried at 50° C. for 12 hours in the air and at 220° C. for 4 hours in nitrogen atmosphere.

Polyimide powder thus obtained was 29.2 g (97.8% yield) and had an inherent viscosity of 0.49 dl/g and a glass transition temperature (Tg) of 240° C.

IR absorption spectrum of the polyimide powder remarkably indicates characteristic absorption bands of imide at around 1780 $cm^{-1}$ and 1720 $cm^{-1}$.

Figure 8:
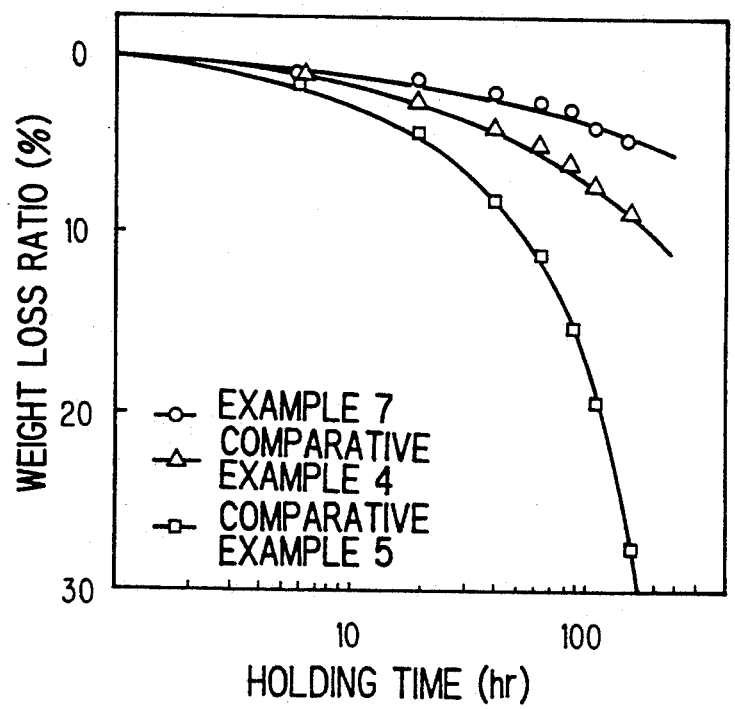
FIG. 8 is a drawing illustrating the results on comparing the thermal-oxidative stability of the polyimide powder obtained in Comparative Example 7, Comparative Example 8 and Example 7. Thermal-oxidative stability was measured by weight loss ratio of the powder when holding time was varied at a temperature of 350° C. in the air.

Thermal-oxidative stability of the polyimide powder thus obtained was evaluated by the same procedures as carried out in Example 7. Results are illustrated in FIG. 8 together with the results of Example 7. As seen in FIG. 8, weight loss ratio of thus-obtained polyimide powder increases with extended retention time. Consequently, thus-obtained polyimide powder has inferior thermal-oxidative stability as compared with that of polyimide obtained in Example 7.

COMPARATIVE EXAMPLE 5

To the same reaction vessel as used in Example 7, 12.0 g (0.06 mole) of 3,3'-diaminodiphenyl ether, 18.23 g (0.059 mole) of 3,3',4,4'-diphenylethertetracarboxylic dianhydride, 0.296 g (0.002 mole) of phthalic anhydride, 0.84 g (0.009 mole) of γ-picoline and 121 g of m-cresol were charged. The mixture was heated to 150° C. with stirring in a nitrogen atmosphere at a temperature increase rate of 1° C./min. The reaction was carried out at 150° C. for 4 hours while distilling out 2 ml of water. The reaction mixture obtained was cooled to the room temperature and poured into about 300 g of methyl ethyl ketone. Precipitated polyimide was filtered, washed with methyl ethyl ketone and dried at 50° C. for 12 hours in the air and at 220° C. for 4 hours in nitrogen atmosphere.

Polyimide powder thus obtained was 27.9 g (98.2% yield) and had an inherent viscosity of 0.49 dl/g and a glass transition temperature (Tg) of 205° C.

IR absorption spectrum of the polyimide powder remarkably indicates characteristic absorption bands of imide at around 1780 $cm^{-1}$ and 1720 $cm^{-1}$.

Thermal-oxidative stability of the polyimide powder thus obtained was evaluated by the same procedures as carried out in Example 7. Results are shown in FIG. 8 together with the results of Example 7.

As seen in FIG. 8, weight loss ratio of thus-obtained polyimide powder increases with extended retention time. Consequently, thus-obtained polyimide powder has inferior thermal-oxidative stability as compared with that of polyimide obtained in Example 7.

EXAMPLE 8

To the same reaction vessel as used in Example 1, 2.00 kg (10 mole) of 3,4'-diaminodiphenyl ether and 47.30 kg of N,N-dimethylacetamide were charged. In a nitrogen atmosphere at the room temperature, 3.06 kg (9.5 mole) of 3,3',4,4'-benzophenonetetracarboxylic dianhydride was added with caution to prevent temperature rise of the solution. Stirring was further continued for 3 hours. The polyamic acid thus obtained had a inherent viscosity of 0.51 dl/g. The inherent viscosity was measured at 35° C. in a N,N-dimethylacetamide solution containing 0.5 g of polyamic acid in 100 ml of the solvent.

To the polyamic acid solution, 27.5 kg of N,N-dimethylacetamide was added, and 4.04 kg of triethylamine and 6.12 kg of acetic anhydride were successively added dropwise with stirring in a nitrogen atmosphere.

The mixture was stirred for about 24 hours at the room temperature and poured into about 250 l of water.

The precipitated light yellow powder was filtered, washed with methanol, and dried at 180° C. for 5 hours under reduced pressure.

Polyimide powder thus obtained was 4.79 kg (99% yield) and had a glass transition temperature of 241° C., melting point of 410° C. by DSC measurement and a 5% weight loss temperature of 558° C. by DTA-TG measurement.

Results of elemental analysis are as follows.

| | Elemental analysis | | |
|---|---|---|---|
| | C | N | H |
| Calculate (%) | 71.60 | 2.90 | 5.76 |
| Found (%) | 71.57 | 2.93 | 5.77 |

EXAMPLES 9-12

The same procedures as described in Example 8 were carried out except that 4,4'-diaminodiphenyl ether was replaced by diaminodiphenyl ethers or diaminobenzophenones which are illustrated in Table 1.

In Example 11, 3,3',4,4'-benzophenonetetracarboxylic dianhydride was further replaced by 3,3',4,4'-diphenylethertetracarboxylic dianhydride.

In Example 12, phthalic anhydride blocking agent was replaced by 3,4-diphenyletherdicarboxylic anhydride.

Glass transition temperature (Tg), 5% weight loss temperature (T 5%), inherent viscosity (η inh) and yield of the polyimide powder obtained in these examples are summarized in Table 1 together with the results in Example 8.

TABLE 1

| Example | Diamine (Amount) | Dianhydride (Amount) | Blocking anhydride (Amount) | Tg (°C.) | T 5% (°C.) | η inh (dl/g) | Elemental analysis (Calc./found) | | | Yield (%) |
|---|---|---|---|---|---|---|---|---|---|---|
| | | | | | | | C (%) | H (%) | N (%) | |
| 8 | 3,4'-ODA[1] 2.0 kg (10 mole) | BTDA[3] 3.06 kg (9.5 mole) | PA[5] 148 g (1.0 mole) | 241 | 558 | 0.51 | 71.60 71.57 | 2.90 2.93 | 5.76 5.77 | 99 |
| 9 | 4,4'-ODA 2.0 kg (10 mole) | BTDA 3.06 kg (9.5 mole) | PA 148 g (1.0 mole) | 254 | 568 | 0.53 | 71.60 71.55 | 2.90 2.94 | 5.76 5.77 | 97 |
| 10 | 3,3'-ODA 2.0 kg (10 mole) | BTDA 3.06 kg (9.5 mole) | PA 148 g (1.0 mole) | 221 | 555 | 0.52 | 71.60 71.69 | 2.90 2.94 | 5.76 5.73 | 98 |
| 11 | 3,3'-DABP[2] 2.12 kg (10 mole) | ODPA[4] 2.95 kg (9.5 mole) | PA 148 g (1.0 mole) | 225 | 545 | 0.51 | 71.60 71.56 | 2.88 2.85 | 5.76 5.80 | 98 |
| 12 | 3,4'-ODA 2.0 kg (10 mole) | BTDA 3.06 kg (9.5 mole) | DPA 240 g (1.0 mole) | 243 | 560 | 0.51 | 71.60 71.64 | 2.90 2.89 | 5.76 5.76 | 99 |

Note:
[1] ODA; diaminodiphenyl ether
[2] DABP; diaminobenzophenone
[3] BTDA; benzophenonetetracarboxylic dianhydride
[4] ODPA; diphenylethertetracarboxylic dianhydride
[5] PA; phthalic anhydride
[6] DPA; diphenyletherdicarboxylic anhydride

EXAMPLES 13–16

Each 100 parts by weight of the polyimide powder obtained in Examples 8–11 were individually mixed with an amount illustrated in Table 2 of silane treated glass fiber CS-3PE-467S(Trade mark of Nitto Boseki Co.) having a fiber length of 3 mm and a fiber diameter of 13 μm by using a drum blender (manufactured by Kawata).

The polyimide composition thus obtained was melt-kneaded in a single screw, extruder having a bore diameter of 30 mm at 360° to 440° C. and the extruded strand was air cooled and cut into pellets.

The pellets thus obtained were injection molded into various test specimens with an Arburg injection molding machine A-22 at the injection pressure of 500 kg/cm$^2$, cylinder temperature of 420° C. and mold temperature of 180° C. Various physical properties were tested by using these specimens. Table 2 illustrates the results on tensile strength according to ASTM D-638, flexural strength and flexural elastic modulus according to ASTM D-790, notched Izod impact strength according to ASTM D-256, heat distortion temperature according to ASTM D-648, and molding shrinkage according to ASTM D-955.

Thermal oxidative stability of each specimen prepared from the polyimide compositions of Examples 13–16 was tested by changing the retention time in a hot air oven at 350° C. and measuring weight loss ratio. Results are illustrated in Table 3.

COMPARATIVE EXAMPLES 6–9

The same procedures as described in Examples 8–11 were carried out except that glass fiber was used in an amount outside the scope of the invention and physical properties were tested. Results are summarized in Table 2.

TABLE 2

| | Resin composition (parts by weight) | | | | Tensile strength (kg/cm$^2$) | Flexural strength (kg/cm$^2$) | Flexural elastic modulus (kg/cm$^2$) | Izod impact strength (notched) (kg·cm/cm) | Heat distortion temperature (18.6 kg/cm$^2$) (°C.) | Molding shrinkage (%) |
|---|---|---|---|---|---|---|---|---|---|---|
| | Resin 100 | | | Glass fiber | | | | | | |
| | Example | Diamine | Dianhydride | | | | | | | |
| Example 13 | 8 | 3,4'-ODA | BTDA | 30 | 1510 | 2220 | 61100 | 14.6 | 229 | 0.3 |
| | | | | 70 | 1660 | 2510 | 70200 | 17.9 | 231 | 0.2 |
| Example 14 | 9 | 4,4'-ODA | BTDA | 30 | 1560 | 2270 | 64200 | 15.0 | 242 | 0.2 |
| | | | | 70 | 1710 | 2560 | 75600 | 18.4 | 246 | 0.2 |
| Example 15 | 10 | 3,3'-ODA | BTDA | 30 | 1480 | 2160 | 56400 | 14.4 | 211 | 0.2 |
| | | | | 70 | 1600 | 2470 | 69300 | 17.2 | 213 | 0.3 |
| Example 16 | 11 | 3,3'-DABP | ODPA | 30 | 1470 | 2100 | 55400 | 13.9 | 209 | 0.2 |
| | | | | 70 | 1630 | 2330 | 67100 | 17.3 | 211 | 0.1 |
| Com. Ex. 6 | 8 | 3,4'-ODA | BTDA | 3 | 940 | 1450 | 29100 | 5.7 | 228 | 0.7 |
| | | | | 120 | strand extrusion impossible | | | | | |
| Com. Ex. 7 | 9 | 4,4'-ODA | BTDA | 3 | 990 | 1600 | 30000 | 5.4 | 243 | 0.5 |
| | | | | 120 | strand extrusion impossible | | | | | |
| Com. Ex. 8 | 10 | 3,3'-ODA | BTDA | 3 | 930 | 1400 | 28800 | 5.7 | 220 | 0.6 |
| | | | | 120 | strand extrusion impossible | | | | | |
| Com. Ex. 9 | 11 | 3,3'-DABP | ODPA | 3 | 930 | 1410 | 28400 | 5.7 | 217 | 0.6 |
| | | | | 120 | strand extrusion impossible | | | | | |

TABLE 3

| Example | Resin composition (parts by weight) Example | Diamine | Dianhydride | Glass fiber | Weight loss ratio (wt. %/hour) 6 | 20 | 42 | 66 | 90 | 114 | 162 |
|---|---|---|---|---|---|---|---|---|---|---|---|
| 13 | 8 | 3,4'-ODA | BTDA | 30 | 0.12 | 0.33 | 0.47 | 0.68 | 0.78 | 1.03 | 1.17 |
|  |  |  |  | 70 | 0.09 | 0.25 | 0.36 | 0.52 | 0.60 | 0.79 | 0.98 |
| 14 | 9 | 4,4'-ODA | BTDA | 30 | 0.06 | 0.09 | 0.15 | 0.21 | 0.29 | 0.34 | 0.55 |
|  |  |  |  | 70 | 0.05 | 0.07 | 0.11 | 0.16 | 0.23 | 0.27 | 0.44 |
| 15 | 10 | 3,3'-ODA | BTDA | 30 | 0.22 | 0.62 | 1.03 | 1.26 | 1.58 | 2.01 | 2.59 |
|  |  |  |  | 70 | 0.16 | 0.48 | 0.79 | 0.96 | 1.21 | 1.53 | 1.48 |
| 16 | 11 | 3,3'-DABP | ODPA | 30 | 0.65 | 0.88 | 1.43 | 1.71 | 2.12 | 2.78 | 3.24 |
|  |  |  |  | 70 | 0.50 | 0.67 | 1.09 | 1.31 | 1.62 | 2.13 | 2.48 |

EXAMPLE 17-20

Each 100 parts by weight of the polyimide powder obtained in Examples 8–11 were individually mixed with an amount illustrated in Table 4 of carbon fiber TORECA (Trade mark of Toray Co.) having an average fiber diameter of 12 μm, length of 3 mm and aspect ratio of 250 by using a drum blender (manufactured by Kawata).

The polyimide composition thus obtained was melt-kneaded in a single screw extruder having a bore diameter of 30 mm at 360° to 440° C. and extruded strand was air cooled and cut into pallets.

The pellets thus obtained were injection molded into various test specimens with an Arburg injection molding machine A-22 at the injection pressure of 500 kg/cm², cylinder temperature of 420° C. and mold temperature of 180° C. Various physical properties were tested by using these specimens. Table 4 illustrates the results on tensile strength, flexural strength, flexural elastic modulus, notched Izod impact strength, heat distortion temperature and molding shrinkage.

Thermal-oxidative stability of each specimen prepared from the polyimide composition of Examples 17-20 was tested by changing the retention time in a hot air oven at 350° C. and measuring weight loss ratio. Results are illustrated in Table 5.

COMPARATIVE EXAMPLES 10-13

The same procedures as described in Examples 17-20 were carried out except that glass fiber was used in an amount outside the scope of the invention and physical properties were tested.

Results are summarized in Table 4.

TABLE 4

| | Resin composition (parts by weight) Example | Diamine | Dianhydride | Carbon fiber | Tensile strength (kg/cm²) | Flexural strength (kg/cm²) | Flexural elastic modulus (kg/cm²) | Izod impact strength (notched) (kg·cm/cm) | Heat distortion temperature (18.6 kg/cm²) (°C.) | Molding shrinkage (%) |
|---|---|---|---|---|---|---|---|---|---|---|
| Example 17 | 8 | 3,4'-ODA | BTDA | 30 | 1510 | 2210 | 59400 | 14.1 | 234 | 0.2 |
|  |  |  |  | 70 | 1700 | 2400 | 69400 | 17.1 | 238 | 0.1 |
| Example 18 | 9 | 4,4'-ODA | BTDA | 30 | 1600 | 2250 | 61600 | 15.0 | 238 | 0.3 |
|  |  |  |  | 70 | 1770 | 2560 | 73000 | 18.8 | 244 | 0.2 |
| Example 19 | 10 | 3,3'-ODA | BTDA | 30 | 1470 | 2160 | 56600 | 13.8 | 210 | 0.3 |
|  |  |  |  | 70 | 1640 | 2330 | 68300 | 16.7 | 213 | 0.2 |
| Example 20 | 11 | 3,3'-DABP | ODPA | 30 | 1490 | 2140 | 56900 | 13.8 | 211 | 0.3 |
|  |  |  |  | 70 | 1660 | 2300 | 68100 | 16.9 | 214 | 0.2 |
| Com. Ex. 10 | 8 | 3,4'-ODA | BTDA | 3 | 950 | 1460 | 28800 | 5.6 | 228 | 0.8 |
|  |  |  |  | 120 | strand extrusion impossible | | | | | |
| Com. Ex. 11 | 9 | 4,4'-ODA | BTDA | 3 | 1010 | 1640 | 30400 | 6.8 | 245 | 0.6 |
|  |  |  |  | 120 | strand extrusion impossible | | | | | |
| Com. Ex. 12 | 10 | 3,3'-ODA | BTDA | 3 | 900 | 1400 | 28400 | 5.4 | 216 | 0.7 |
|  |  |  |  | 120 | strand extrusion impossible | | | | | |
| Com. Ex. 13 | 11 | 3,3'-DABP | ODPA | 3 | 880 | 1400 | 28100 | 5.6 | 212 | 0.6 |
|  |  |  |  | 120 | strand extrusion impossible | | | | | |

TABLE 5

| Example | Resin composition (parts by weight) Example | Diamine | Dianhydride | Potassium titanate fiber | Weight loss ratio (wt. %/hour) 6 | 20 | 42 | 66 | 90 | 114 | 162 |
|---|---|---|---|---|---|---|---|---|---|---|---|
| 17 | 8 | 3,4'-ODA | BTDA | 30 | 0.10 | 0.30 | 0.44 | 0.64 | 0.73 | 0.98 | 1.15 |
|  |  |  |  | 70 | 0.07 | 0.23 | 0.33 | 0.48 | 0.56 | 0.76 | 0.85 |
| 18 | 9 | 4,4'-ODA | BTDA | 30 | 0.07 | 0.14 | 0.32 | 0.42 | 0.59 | 0.79 | 0.90 |
|  |  |  |  | 70 | 0.05 | 0.11 | 0.24 | 0.39 | 0.44 | 0.60 | 0.73 |
| 19 | 10 | 3,3'-ODA | BTDA | 30 | 0.20 | 0.60 | 1.00 | 1.21 | 1.53 | 1.97 | 2.53 |
|  |  |  |  | 70 | 0.13 | 0.44 | 0.74 | 0.91 | 1.17 | 1.47 | 1.93 |
| 20 | 11 | 3,3'-DABP | ODPA | 30 | 0.61 | 0.84 | 1.40 | 1.66 | 2.07 | 2.71 | 3.19 |
|  |  |  |  | 70 | 0.48 | 0.64 | 1.02 | 1.25 | 1.57 | 2.08 | 2.42 |

EXAMPLES 21-24

Each 100 parts by weight of the polyimide powder obtained in Examples 8-11 were individually mixed with an amount illustrated in Table 6 of potassium titanate fiber TISMO (Trade mark of Otsuka Chem. Co.)

having an average fiber diameter of 0.2 μm and an average fiber length of 20 μm by using a drum blender (manufactured by Kawata).

The polyimide composition thus obtained was melt-kneaded in a single screw extruder having a bore diameter of 30 mm at 360° to 440° C. and extruded strand was air cooled and cut into pellets.

The pellets thus obtained were injection molded into various test specimens with an Arburg injection molding machine A-22 at the injection pressure of 500 kg/cm$^2$, cylinder temperature of 420° C. and mold temperature of 180° C. Various physical properties were tested by using these specimens. Table 6 illustrates the results on tensile strength, flexural strength, flexural elastic modulus, notched Igod impact strength, heat distortion temperature and molding shrinkage.

Thermal-oxidative stability of each specimen prepared from the polyimide compositions of Examples 21-24 was tested by changing the retention time in a hot air oven at 350° C. and measuring weight loss ratio. Results are illustrated in Table 7.

COMPARATIVE EXAMPLE 14-17

The same procedures as described in Examples 21-24 were carried out except that glass fiber was used in an amount outside the scope of the invention and physical properties were tested.

Results are summarized in Table 6.

with an amount illustrated in Table 8 of aromatic polyamide fiber, Kevlar (Trade mark of E. I. Du Pont de Nemours & Co.) having an average fiber length of 3 μm by using a drum blender (manufactured by Kawata).

The polyimide composition thus obtained was melt-kneaded in a single screw extruder having a bore diameter of 30 mm at 310° to 350° C. and extruded strand was air cooled and cut into pellets.

The pellets thus obtained were injection molded into various test specimens with an Arburg injection molding machine A-22 at the injection pressure of 500 kg/cm$^2$, cylinder temperature of 400° C. and mold temperature of 180° C. Various physical properties were tested by using these specimens. Table 8 illustrates the results on tensile strength, flexural strength, flexural elastic modulus, notched Izod impact strength, heat distortion temperature and molding shrinkage.

Thermal-oxidative stability of each specimen prepared from the polyimide compositions of Examples 25-28 was tested by changing the retention time in a hot air oven at 350° C. and measuring weight loss ratio. Results are illustrated in Table 9.

COMPARATIVE EXAMPLE 18-21

The same procedures as described in Examples 25-28 were carried out except that glass fiber was used in an amount outside the scope of the invention and physical properties were tested.

Results are summarized in Table 8.

TABLE 6

| | Resin composition (parts by weight) | | | Potassium titanate fiber | Tensile strength (kg/cm$^2$) | Flexural strength (kg/cm$^2$) | Flexural elastic modulus (kg/cm$^2$) | Izod impact strength (notched) (kg·cm/cm) | Heat distortion temperature (18.6 kg/cm$^2$) (°C.) | Molding shrinkage (%) |
|---|---|---|---|---|---|---|---|---|---|---|
| | | Resin 100 | | | | | | | | |
| | Example | Diamine | Dianhydride | | | | | | | |
| Example 21 | 8 | 3,4'-ODA | BTDA | 30 | 1050 | 1440 | 32100 | 14.2 | 227 | 0.2 |
| | | | | 70 | 1550 | 1660 | 40500 | 15.5 | 230 | 0.3 |
| Example 22 | 9 | 4,4'-ODA | BTDA | 30 | 1100 | 1510 | 34000 | 14.9 | 239 | 0.2 |
| | | | | 70 | 1660 | 1710 | 42600 | 16.3 | 243 | 0.2 |
| Example 23 | 10 | 3,3'-ODA | BTDA | 30 | 1030 | 1400 | 31100 | 13.6 | 212 | 0.3 |
| | | | | 70 | 1540 | 1600 | 39600 | 15.0 | 216 | 0.2 |
| Example 24 | 11 | 3,3'-DABP | ODPA | 30 | 1050 | 1390 | 31000 | 13.9 | 209 | 0.1 |
| | | | | 70 | 1550 | 1570 | 39300 | 15.0 | 211 | 0.1 |
| Comp. Ex. 14 | 8 | 3,4'-ODA | BTDA | 3 | 690 | 1060 | 16100 | 5.4 | 227 | 0.7 |
| | | | | 120 | | | strand extrusion impossible | | | |
| Comp. Ex. 15 | 9 | 4,4'-ODA | BTDA | 3 | 710 | 1130 | 17400 | 6.8 | 244 | 0.8 |
| | | | | 120 | | | strand extrusion impossible | | | |
| Comp. Ex. 16 | 10 | 3,3'-ODA | BTDA | 3 | 660 | 1010 | 16000 | 5.4 | 214 | 0.5 |
| | | | | 120 | | | strand extrusion impossible | | | |
| Comp. Ex. 17 | 11 | 3,3'-DABP | ODPA | 3 | 660 | 990 | 15800 | 5.4 | 212 | 0.6 |
| | | | | 120 | | | strand extrusion impossible | | | |

TABLE 7

| | Resin composition (parts by weight) | | | Potassium titanate fiber | Weight loss ratio (wt. %/hour) | | | | | | |
|---|---|---|---|---|---|---|---|---|---|---|---|
| | | Resin 100 | | | | | | | | | |
| Example | Example | Diamine | Dianhydride | | 6 | 20 | 42 | 66 | 90 | 114 | 162 |
| 21 | 8 | 3,4'-ODA | BTDA | 30 | 0.04 | 0.36 | 0.50 | 0.72 | 0.85 | 1.10 | 1.20 |
| | | | | 70 | 0.11 | 0.29 | 0.39 | 0.58 | 0.66 | 0.84 | 0.96 |
| 22 | 9 | 4,4'-ODA | BTDA | 30 | 0.09 | 0.15 | 0.30 | 0.46 | 0.69 | 0.90 | 1.04 |
| | | | | 70 | 0.06 | 0.11 | 0.19 | 0.36 | 0.56 | 0.73 | 0.80 |
| 23 | 10 | 3,3'-ODA | BTDA | 30 | 0.24 | 0.66 | 1.07 | 1.30 | 1.65 | 2.07 | 2.64 |
| | | | | 70 | 0.16 | 0.49 | 0.82 | 0.99 | 1.23 | 1.57 | 2.01 |
| 24 | 11 | 3,3'-DABP | ODPA | 30 | 0.66 | 0.90 | 1.44 | 1.73 | 2.14 | 2.82 | 3.26 |
| | | | | 70 | 0.49 | 0.69 | 1.13 | 1.34 | 1.66 | 2.17 | 2.54 |

EXAMPLES 25-28

Each 100 parts by weight of the polyimide powder obtained in Examples 8-11 were individually mixed

TABLE 8

| Example | Resin 100 Example | Resin 100 Diamine | Resin 100 Dianhydride | Aromatic polyamide fiber | Tensile strength (kg/cm²) | Flexural strength (kg/cm²) | Flexural elastic modulus (kg/cm²) | Izod impact strength (notched) (kg·cm/cm) | Heat distortion temperature (18.6 kg/cm²) (°C.) | Molding shrinkage (%) |
|---|---|---|---|---|---|---|---|---|---|---|
| Example 25 | 8 | 3,4'-ODA | BTDA | 30 | 990 | 1240 | 23900 | 7.3 | 230 | 0.1 |
|  |  |  |  | 70 | 1450 | 1630 | 36400 | 8.8 | 233 | 0.2 |
| Example 26 | 9 | 4,4'-ODA | BTDA | 30 | 1020 | 1320 | 24900 | 7.8 | 243 | 0.1 |
|  |  |  |  | 70 | 1510 | 1700 | 38100 | 9.1 | 244 | 0.2 |
| Example 27 | 10 | 3,3'-ODA | BTDA | 30 | 950 | 1200 | 23100 | 7.1 | 209 | 0.2 |
|  |  |  |  | 70 | 1410 | 1590 | 35300 | 8.5 | 214 | 0.2 |
| Example 28 | 11 | 3,3'-DABP | ODPA | 30 | 960 | 1190 | 23000 | 7.2 | 206 | 0.3 |
|  |  |  |  | 70 | 1400 | 1580 | 35300 | 8.6 | 214 | 0.2 |
| Comp. Ex. 18 | 8 | 3,4'-ODA | BTDA | 3 | 580 | 920 | 11700 | 3.3 | 215 | 0.5 |
|  |  |  |  | 120 | strand extrusion impossible | | | | | |
| Comp. Ex. 19 | 9 | 4,4'-ODA | BTDA | 3 | 600 | 930 | 12600 | 3.3 | 229 | 0.6 |
|  |  |  |  | 120 | strand extrusion impossible | | | | | |
| Comp. Ex. 20 | 10 | 3,3'-ODA | BTDA | 3 | 520 | 880 | 10900 | 3.1 | 209 | 0.6 |
|  |  |  |  | 120 | strand extrusion impossible | | | | | |
| Comp. Ex. 21 | 11 | 3,3'-DABP | ODPA | 3 | 580 | 880 | 12100 | 3.2 | 214 | 0.6 |
|  |  |  |  | 120 | strand extrusion impossible | | | | | |

TABLE 9

| Example | Resin 100 Example | Resin 100 Diamine | Resin 100 Dianhydride | Aromatic polyamide fiber | Weight loss ratio (wt. %/hour) 6 | 20 | 42 | 66 | 90 | 114 | 162 |
|---|---|---|---|---|---|---|---|---|---|---|---|
| 25 | 8 | 3,4'-ODA | BTDA | 30 | 0.15 | 0.36 | 0.53 | 0.74 | 0.83 | 1.10 | 1.25 |
|  |  |  |  | 70 | 0.11 | 0.27 | 0.40 | 0.59 | 0.68 | 0.85 | 0.96 |
| 26 | 9 | 4,4'-ODA | BTDA | 30 | 0.08 | 0.09 | 0.23 | 0.36 | 0.41 | 0.51 | 0.64 |
|  |  |  |  | 70 | 0.06 | 0.07 | 0.14 | 0.22 | 0.30 | 0.36 | 0.41 |
| 27 | 10 | 3,3'-ODA | BTDA | 30 | 0.26 | 0.69 | 1.10 | 1.32 | 1.64 | 2.10 | 2.71 |
|  |  |  |  | 70 | 0.19 | 0.55 | 0.85 | 1.01 | 1.30 | 1.61 | 2.06 |
| 28 | 11 | 3,3'-DABP | ODPA | 30 | 0.69 | 0.93 | 1.50 | 1.78 | 2.20 | 2.91 | 3.32 |
|  |  |  |  | 70 | 0.53 | 0.72 | 1.20 | 1.41 | 1.69 | 2.22 | 2.57 |

COMPARATIVE EXAMPLE 22

Polyimide powder was prepared by carrying out the same procedures as described in Example 8 except that 4,4'-diaminodiphenyl ether was replaced by 3,3'-diaminodiphenyl sulfone. The polyimide powder had a glass transition temperature (Tg) of 256° C., 5% weight loss temperature (T 5%) of 563° C., inherent viscosity ($\eta$ inh) of 0.40 dl/g, and the yield of 97%.

Using the polyimide powder thus obtained, preparation of polyimide compositions and injection molding of pellets were carried out by the same procedures as described in Examples 10, 14, 18 and 22, respectively. Physical properties of the specimens are illustrated in Table 10. Results of thermal-oxidative stability test at 350° C. in the air were compared with the results of Examples 10, 14, 18 and 22 and are illustrated in Table 11.

TABLE 10

|  |  | Tensile strength (kg/cm²) | Flexural strength (kg/cm²) | Flexural elastic modulus (kg/cm²) | Izod impact strength (notched) (kg·cm/cm) | Heat distortion temperature (186 kg/cm²) (°C.) | Molding shrinkage (°C.) |
|---|---|---|---|---|---|---|---|
| Glass fiber | 30 | 1420 | 2050 | 54400 | 12.4 | 250 | 0.3 |
|  | 70 | 1550 | 2300 | 66200 | 16.5 | 254 | 0.3 |
| Carbon fiber | 30 | 1440 | 2110 | 55500 | 12.4 | 252 | 0.2 |
|  | 70 | 1610 | 2260 | 64700 | 16.3 | 256 | 0.3 |
| Potassium titanate fiber | 30 | 970 | 1360 | 29400 | 12.4 | 251 | 0.3 |
|  | 70 | 1490 | 1530 | 36600 | 15.3 | 256 | 0.2 |
| Aromatic polyamide fiber | 30 | 900 | 1140 | 22200 | 7.0 | 250 | 0.2 |
|  | 70 | 1330 | 1510 | 32600 | 8.3 | 253 | 0.3 |

TABLE 11

| Example | Resin 100 Diamine | Resin 100 Dianhydride | Fiber |  | Weight loss ratio (wt. %/hour) 6 | 20 | 42 | 66 | 90 | 114 | 162 |
|---|---|---|---|---|---|---|---|---|---|---|---|
| Example 3 | 3,3'-ODA | BTDA | Glass fiber | 30 | 0.22 | 0.62 | 1.03 | 1.26 | 1.58 | 2.01 | 2.59 |
|  |  |  |  | 70 | 0.16 | 0.48 | 0.79 | 0.96 | 1.21 | 1.53 | 1.98 |
| Comparat. Example 22 | 3,3'-DAS[1)] | BTDA |  | 30 | 0.39 | 0.93 | 1.58 | 1.89 | 2.33 | 3.17 | 4.00 |
|  |  |  |  | 70 | 0.32 | 0.69 | 1.20 | 1.44 | 1.81 | 2.35 | 3.38 |
| Example 7 | 3,3'-ODA | BTDA | Carbon fiber | 30 | 0.20 | 0.60 | 1.00 | 1.21 | 1.53 | 1.97 | 2.53 |
|  |  |  |  | 70 | 0.13 | 0.44 | 0.74 | 0.91 | 1.17 | 1.47 | 1.93 |

TABLE 11-continued

| | Resin composition (parts by weight) | | | Weight loss ratio (wt. %/hour) | | | | | | |
|---|---|---|---|---|---|---|---|---|---|---|
| | Resin 100 | | | | | | | | | |
| | Diamine | Dianhydride | Fiber | 6 | 20 | 42 | 66 | 90 | 114 | 162 |
| Comparat. Example 22 | 3,3'-DAS | BTDA | | 30 | 0.33 | 0.97 | 1.61 | 2.01 | 2.50 | 2.87 | 3.82 |
| | | | | 70 | 0.25 | 0.67 | 1.10 | 1.32 | 1.77 | 2.25 | 2.95 |
| Example 11 | 3,3'-ODA | BTDA | Potassium titanate fiber | 30 | 0.24 | 0.66 | 1.07 | 1.30 | 1.65 | 2.07 | 2.64 |
| | | | | 70 | 0.16 | 0.44 | 0.82 | 0.99 | 1.23 | 1.57 | 2.01 |
| Comparat. Example 22 | 3,3'-DAS | BTDA | | 30 | 0.44 | 1.04 | 1.73 | 2.14 | 2.66 | 3.17 | 3.98 |
| | | | | 70 | 0.32 | 0.77 | 1.29 | 1.58 | 1.96 | 2.39 | 3.07 |
| Example 15 | 3,3'-ODA | BTDA | Aromatic polyamide fiber | 30 | 0.26 | 0.69 | 1.10 | 1.32 | 1.64 | 2.10 | 2.71 |
| | | | | 70 | 0.19 | 0.55 | 0.85 | 1.01 | 1.30 | 1.61 | 2.06 |
| Comparat. Example 22 | 3,3'-DAS | BTDA | | 30 | 0.45 | 1.12 | 1.80 | 2.38 | 2.77 | 3.36 | 4.04 |
| | | | | 70 | 0.36 | 0.88 | 1.32 | 1,76 | 2.26 | 2.66 | 3.27 |

What is claimed is:

1. A readily melt processable polyimide comprising a polymer molecule terminally blocked with a divalent radical derived from dicarboxylic acid anhydride represented by the formula (IV):

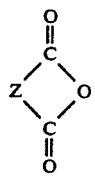

(IV)

wherein Z is a divalent radical selected from the group consisting of a monoaromatic radical which is substantially unsubstituted or substituted with a radical having no reactivity with amine or carboxylic acid anhydride and has from 5 to 15 carbon atoms, condensed polyaromatic radical or noncondensed aromatic radical connected to each other with a direct bond or a bridge member, and having a fundamental skeleton represented by recurrind structural units of formula (III):

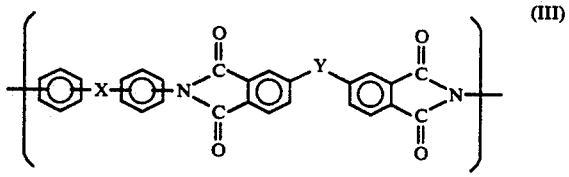

(III)

wherein X and Y are —O— or —CO— and differ from each other.

2. The polyimide of claim 1 wherein the recurring structural units of the formula (III) are recurring structural units of the formula (III-a);

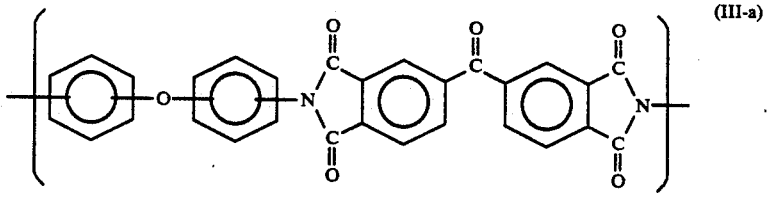

(III-a)

3. The polyimide of claim 1 wherein the recurring structural units of the formula (III) are recurring structural units of the formula (III-b):

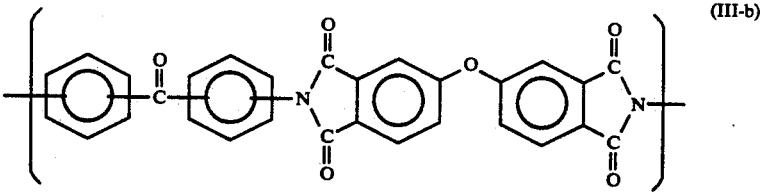

(III-b)

4. The polyimide of claim 1 obtained by a process comprising reacting 1 mole of a diamine compound represented by the formula (VII)

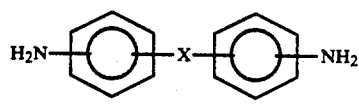

(VII)

wherein X is —O— or —CO—, with from 0.8 to 1.0 mole of tetracarboxylic acid dianhydride represented by the formula (VIII):

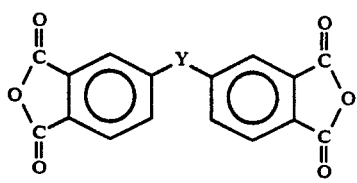

wherein Y is —O— or —CO— and differs from X in the formula (VII), in the presence of from 0.001 to 1.0 mole of dicarboxylic acid anhydride represented by the formula (IV):

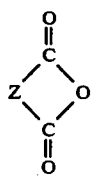

wherein Z is a divalent radical selected from the group consisting of a monoaromatic radical which is substantially unsubstituted or substituted with a radical having no reactivity with amine or carboxylic acid anhydride and has from 5 to 15 carbons atoms, condensed polyaromatic radical or noncondensed aromatic radical connected to each other with a direct bond or a bridge member.

5. The polyimide of claim 4 wherein the diamine compound of the formula (VII) is a diaminodiphenyl ether represented by the formula (VII-a):

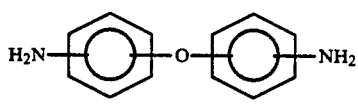

and the tetracarboxylic acid dianhydride of the formula (VIII) is 3,3′,4,4′-benzophenonetetracarboxylic dianhydride of the formula (VIII-a):

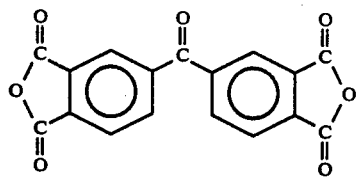

6. The polyimide of claim 4 wherein the diamine compound of the formula (VII) is a diaminobenzophenone represented by the formula (VII-b):

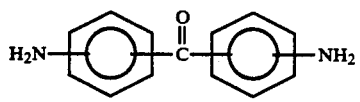

and the tetracarboxylic acid dianhydride of the formula (VIII) is 3,3′,4,4′-diphenylethertetracarboxylic dianhydride of the formula (VIII-b):

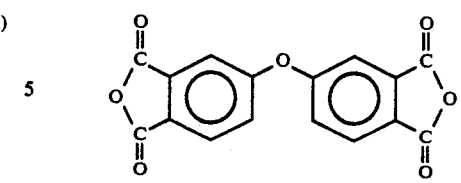

7. A process for preparing the polyimide of claim 1 comprising reacting 1 mole of a diamine compound essentially represented by the formula (VII):

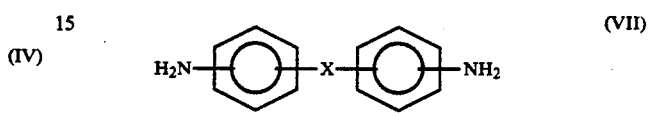

wherein X is —O— or —CO—, with from 0.8 to 1.0 mole or tetracarboxylic acid dianhydride represented by the formula (VIII):

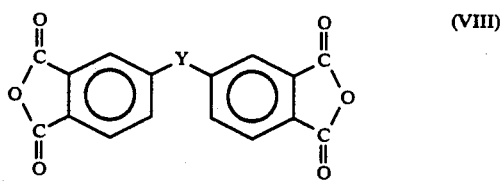

wherein Y is —O— or —CO— and differs from X in the formula (VII), in the presence of from 0.001 to 1.0 mole of dicarboxylic acid anhydride represented by the formula (IV):

wherein Z is a divalent radical selected from the group consisting of a monoaromatic radical which is substantially unsubstituted or substituted with a radical having no reactivity with amine or carboxylic acid anhydride and has from 5 to 15 carbons atoms, condensed polyaromatic radical or noncondensed aromatic radical connected each other with a direct bond or a bridge member.

8. The process for preparing the polyimide of claim 7 wherein the diamine compound represented by the formula (VII) is a diaminodiphenyl ether represented by the formula (VII-a):

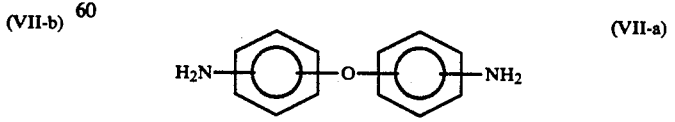

and the tetracarboxylic acid dianhydride of the formula (VIII) is 3,3′,4,4′-benzophenonetetracarboxylic dianhydride of the formula (VIII-a):

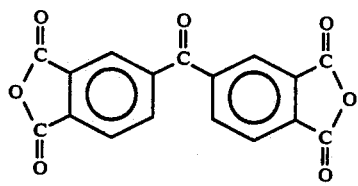
(VIII-a)

9. The process for preparing the polyimide of claim 7 wherein the diamine compound of the formula (VII) is a diaminobenzophenone represented by the formula (VII-b):

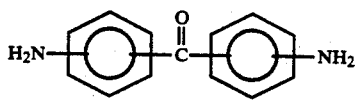
(VII-b)

and the tetracarboxylic acid dianhydride of the formula (VIII) is 3,3',4,4'-diphenylethertetracarboxylic dianhydride of the formula (VIII-b):

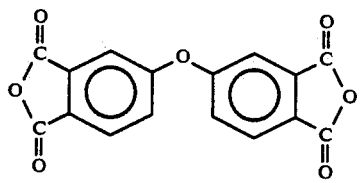
(VIII-b)

10. A polyimide composition comprising 100 parts by weight of a polyimide being blocked at the terminal of a polymer molecule with a divalent radical derived from dicarboxylic acid anhydride represented by the formula (IV):

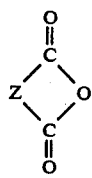
(IV)

wherein Z is a divalent radical selected from the group consisting of a monoaromatic radical which is substantially unsubstituted or substituted with a radical having no reactivity with amine or carboxylic acid anhydride and has from 5 to 15 carbons atoms, condensed polyaromatic radical or noncondensed aromatic radical connected each other with a direct bond or a bridge member, and having a fundamental skeleton represented by recurring structural unit of the formula (III);

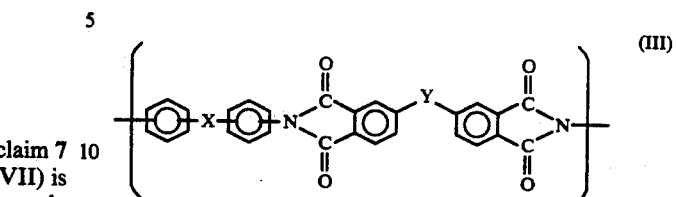
(III)

wherein X and Y are —O— or —CO— and differ each other, and from 5 to 100 parts by weight of a fibrous reinforcement.

11. The polyimide composition of claim 10 wherein the fibrous reinforcement is a single fiber or a mixture of the fiber selected from the group consisting of glass fiber, carbon fiber, potassium titanate fiber and aromatic polyamide fiber.

12. The polyimide composition of claim 11 wherein the aromatic polyamide fiber has recurring structural units of the formula (1):

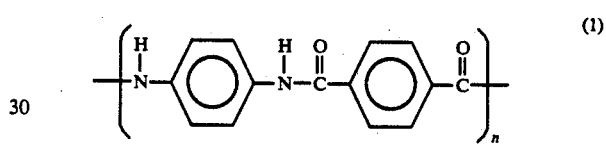
(1)

the formula (2):

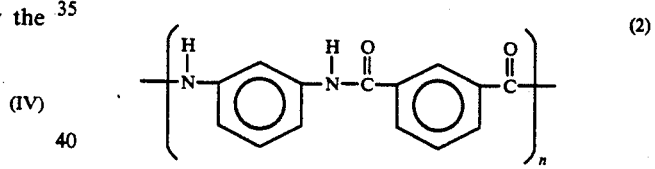
(2)

or the formula (3):

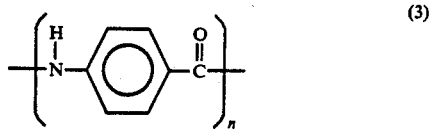
(3)

* * * * *

UNITED STATES PATENT AND TRADEMARK OFFICE
CERTIFICATE OF CORRECTION

PATENT NO. : 5,283,313
DATED : February 1, 1994
INVENTOR(S) : Yamashita et al.

It is certified that error appears in the above-identified patent and that said Letters Patent is hereby corrected as shown below:

Title page, item [57], col. 2,
In the Abstract, line 6 (after the formula), after "nected" insert --to--.

Claim 1, column 29, line 68, "recurrind" to should be --recurring--.

Claim 7, column 32, line 22, "or" should be --of--;

column 32, line 53, after "nected" insert --to--.

Claim 10, column 34, line 1, after "nected" insert --to--;

column 34, line 14, after "differ" insert --from--.

Signed and Sealed this

Eleventh Day of October, 1994

Attest:

BRUCE LEHMAN

*Attesting Officer*    *Commissioner of Patents and Trademarks*